US012675586B2

(12) United States Patent
Guim Bernat et al.

(10) Patent No.: US 12,675,586 B2
(45) Date of Patent: Jul. 7, 2026

(54) ALLOCATION OF ACCESS TO A CHIPLET ACROSS AN INTERCONNECT SWITCH

(71) Applicant: Intel Corporation, Santa Clara, CA (US)

(72) Inventors: Francesc Guim Bernat, Barcelona (ES); Marcos Carranza, Portland, OR (US); Kshitij Doshi, Tempe, AZ (US); Ned Smith, Beaverton, OR (US); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/080,635

(22) Filed: Dec. 13, 2022

(65) Prior Publication Data

US 2024/0193284 A1 Jun. 13, 2024

(51) Int. Cl.
*G06F 21/60* (2013.01)

(52) U.S. Cl.
CPC ................................. *G06F 21/604* (2013.01)

(58) Field of Classification Search
CPC .................................................... G06F 21/604
See application file for complete search history.

(56) References Cited

U.S. PATENT DOCUMENTS

| | | | |
|---|---|---|---|
| 11,100,028 B1 * | 8/2021 | Subramaniam | ..... G06F 13/4221 |
| 2016/0350156 A1 * | 12/2016 | Lo | ......................... G06F 9/5094 |
| 2020/0125503 A1 | 4/2020 | Graniello et al. | |

| | | |
|---|---|---|
| 2020/0285420 A1 | 9/2020 | Bernat et al. |
| 2020/0327084 A1 | 10/2020 | Choudhary et al. |
| 2020/0327088 A1 | 10/2020 | Choudhary et al. |
| 2020/0328879 A1 | 10/2020 | Makaram et al. |
| 2021/0011864 A1 | 1/2021 | Bernat et al. |
| 2021/0240655 A1 | 8/2021 | Sharma |
| 2021/0311643 A1 | 10/2021 | Shanbhogue et al. |
| 2021/0373951 A1 | 12/2021 | Malladi et al. |
| 2022/0114032 A1 | 4/2022 | Bernat et al. |
| 2022/0121386 A1 | 4/2022 | Hsu et al. |
| 2022/0179818 A1 | 6/2022 | Natu |
| 2022/0263913 A1 | 8/2022 | Zhang et al. |

(Continued)

FOREIGN PATENT DOCUMENTS

| | | |
|---|---|---|
| WO | 2022036536 | 2/2022 |

*Primary Examiner* — Ponnoreay Pich
(74) *Attorney, Agent, or Firm* — Essential Patents Group, LLP

(57) ABSTRACT

Techniques and mechanisms to allocate functionality of a chiplet for access by one or more processor cores which are coupled to remote processor via a network switch. In an embodiment, a composite chip communicates with the switch via a Compute Express Link (CXL) link. The switch receives capability information which identifies both a chiplet of the composite chip, and a functionality which is available from a resource of that chiplet. Based on the capability information, the switch provides an inventory of chiplet resources. In response to an allocation request, the switch accesses the inventory to identify whether a suitable chiplet resource is available. Based on the access, the switch configures a chip to enable an allocation of a chiplet resource. In another embodiment, the chiplet resource is allocated at a sub-processor level of granularity, and disables access to the chiplet resource by one or more local processor cores.

20 Claims, 20 Drawing Sheets

(56)          References Cited

U.S. PATENT DOCUMENTS

| | | | | |
|---|---|---|---|---|
| 2023/0017643 A1* | 1/2023 | Shah | ................... | G06F 12/0868 |
| 2024/0020174 A1* | 1/2024 | Han | ...................... | G06F 9/5055 |
| 2024/0193284 A1* | 6/2024 | Guim Bernat | ........ | G06F 21/604 |

* cited by examiner

200

210

Provide first capability information to a switch, the first capability information comprising an identifier of a first chiplet of the first chip, and an identifier of a first functionality of the first chiplet

212

Receive from the switch an advertisement of an availability of multiple chiplets

214

Based on the advertisement, provide via a CXL link to the switch a request to access a functionality of the multiple chiplets, wherein the switch accesses the inventory based on the request to identify a second chiplet of a second chip

216

Receive from the switch an allocation of a resource of the second chiplet, the allocation is based on the request

218

Perform a workload with the second chiplet based on the allocation

220

After a completion of the workload, receive a deallocation of the resource from the second chip

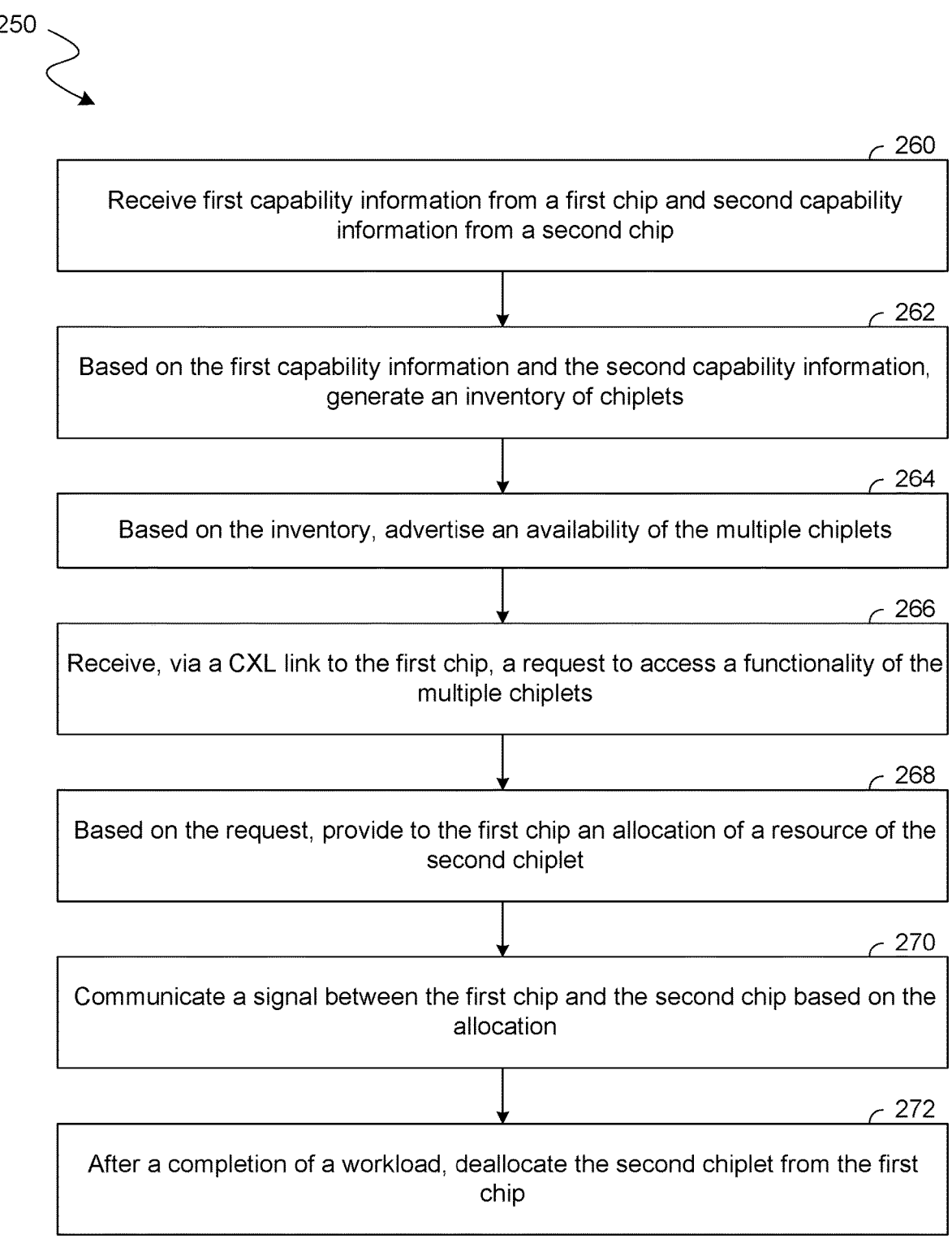

260

Receive first capability information from a first chip and second capability information from a second chip

262

Based on the first capability information and the second capability information, generate an inventory of chiplets

264

Based on the inventory, advertise an availability of the multiple chiplets

266

Receive, via a CXL link to the first chip, a request to access a functionality of the multiple chiplets

268

Based on the request, provide to the first chip an allocation of a resource of the second chiplet

270

Communicate a signal between the first chip and the second chip based on the allocation

272

After a completion of a workload, deallocate the second chiplet from the first chip

FIG. 2B

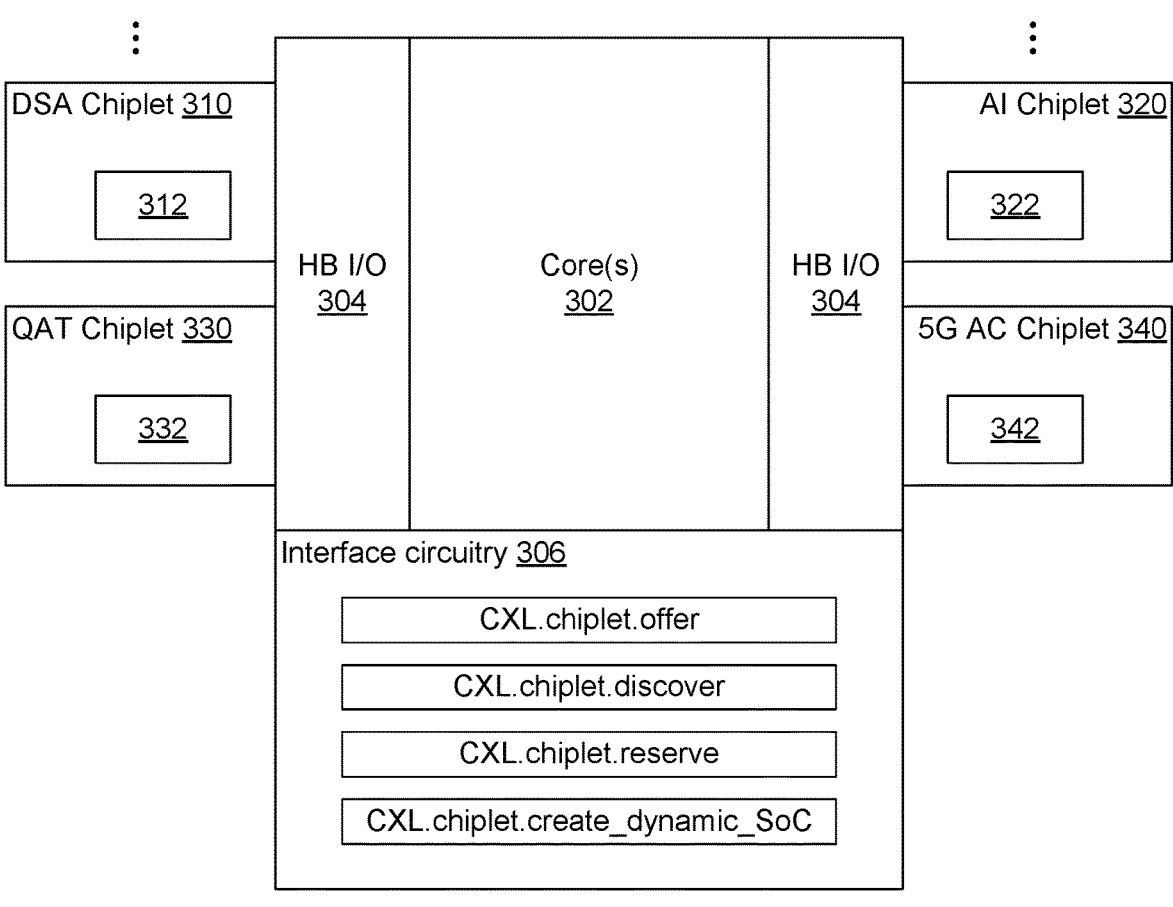
FIG. 3A

| Platform ID | Chiplet ID | Expiration Data | Metadata | Perf. Proxies |
|---|---|---|---|---|
| ID | ID | Timestamp | Metadata | Proxies |
| 0x343 | 0x2 | 232311 | {TYPE=DSA, VERSION=3.2,...} | {F1=16 Gbs, F2=8 Gbs,...} |
| ... | ... | ... | ... | ... |

370

| Dynamic sys. ID | Platform ID | Chiplets List | QOS Information | Expiration |
|---|---|---|---|---|
| ID | ID | List | Metadata | Expiration |
| 0x004 | 0x340 | {0x343/0x2,...} | {10ms LAT/2 Gbs,...} | 232300 |
| ... | ... | ... | ... | ... |

380

400

| CXL.Resource_request | Attribute |
|---|---|
| Resource.category | cxl.mem/cxl.acc/cxl.storage |
| Resoure.time_requested | # of epochs |
| Resource_sla_req | Level 1...5 |
| Resource.requestor_node_id | Node ID for the requestor |

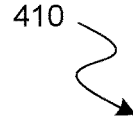

| CXL.Resource_allocate | Attribute |
|---|---|
| Resource.category | cxl.mem/cxl.acc/cxl.storage |
| Resoure.time_allocated | # of epochs |
| Resource_sla_available | Level 1...5 |
| Resource.assignee_node_id | Node ID for the resource owner |

| CXL.Resource_assignment_req | Attribute |
|---|---|
| Resource.category | cxl.mem/cxl.acc/cxl.storage |
| Resoure.time_required | # of epochs |
| Resource_sla_required | Level 1...5 |
| Resource.requestor_node_id | Node ID for the requesting component |

FIG. 4C

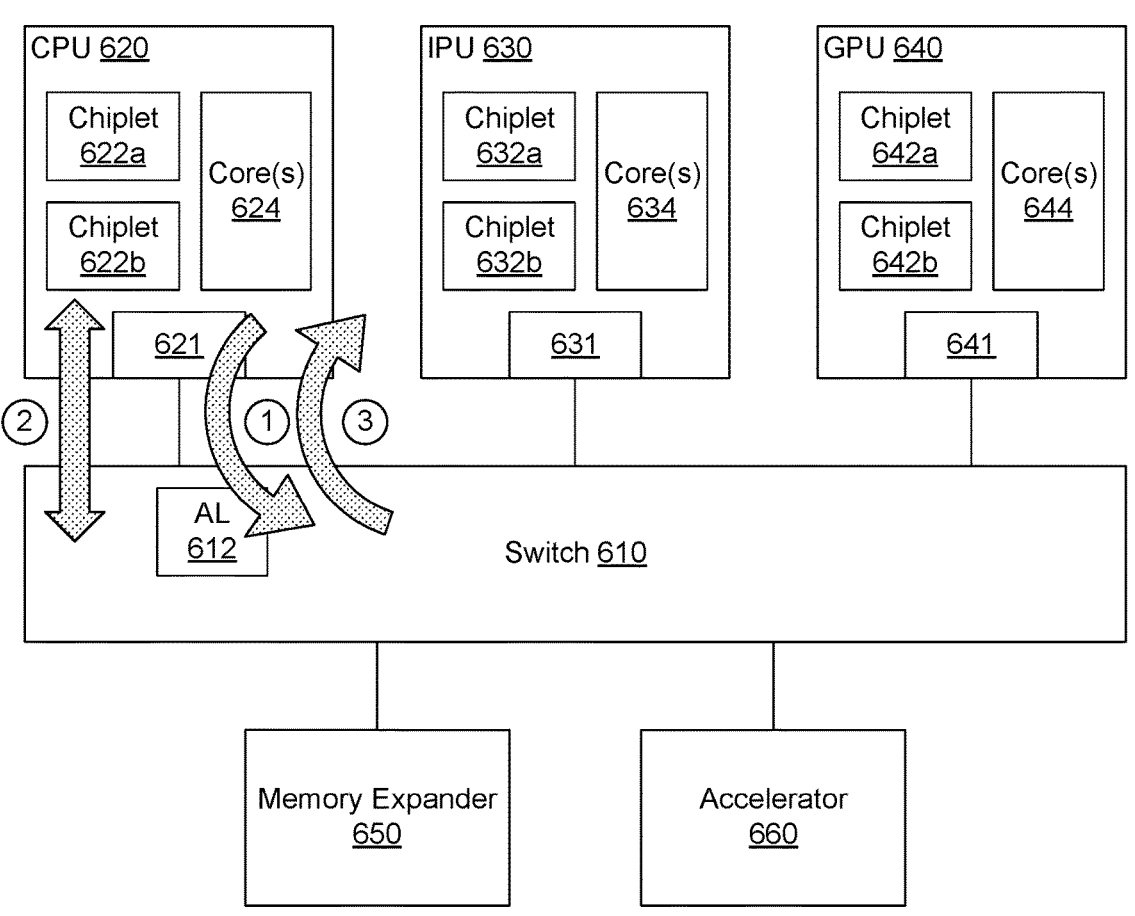
FIG. 6

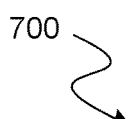
700
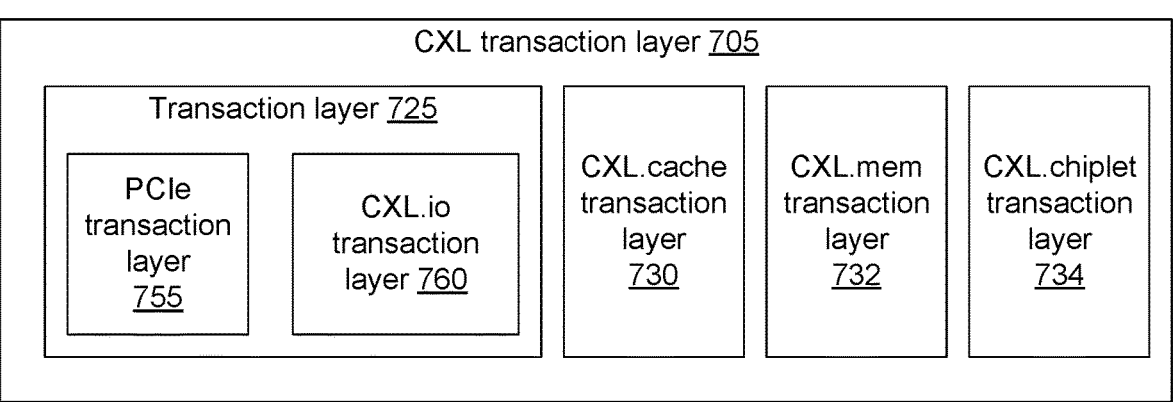
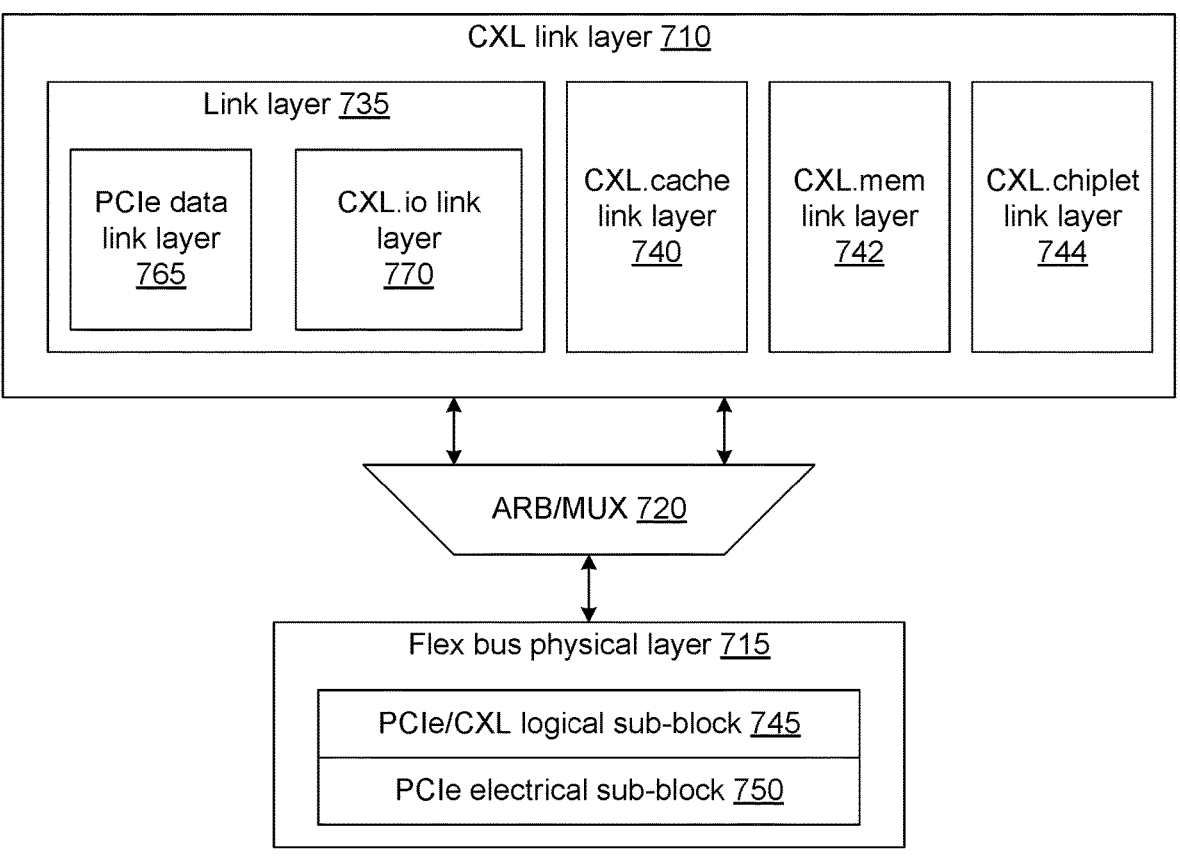
FIG. 7

PROCESSOR 900
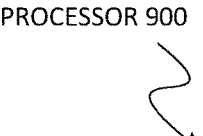
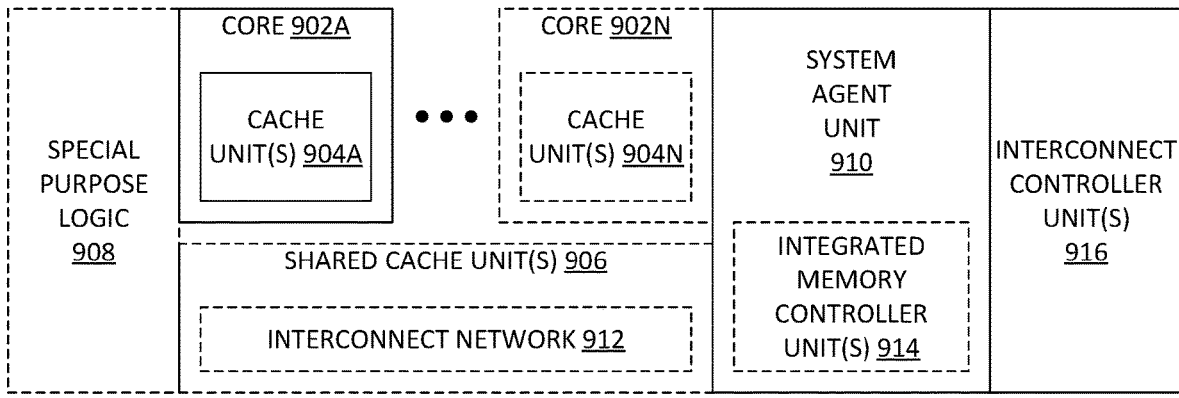
| SPECIAL PURPOSE LOGIC 908 | CORE 902A | | CORE 902N | SYSTEM AGENT UNIT 910 | INTERCONNECT CONTROLLER UNIT(S) 916 |
|---|---|---|---|---|---|
CACHE UNIT(S) 904A    ● ● ●    CACHE UNIT(S) 904N
SHARED CACHE UNIT(S) 906
INTERCONNECT NETWORK 912
INTEGRATED MEMORY CONTROLLER UNIT(S) 914
FIG. 9

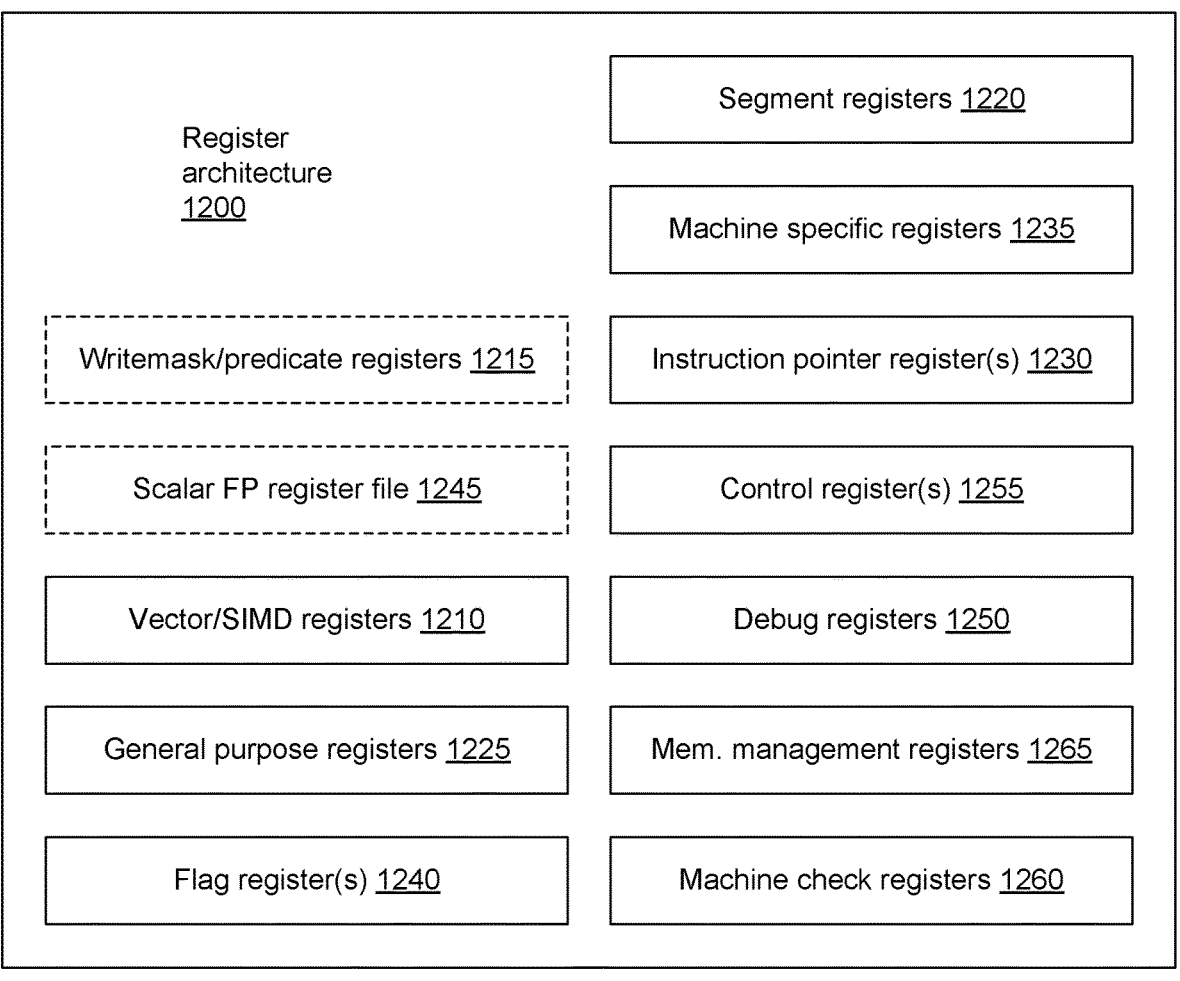

Register
architecture
1200

Segment registers 1220

Machine specific registers 1235

Writemask/predicate registers 1215

Instruction pointer register(s) 1230

Scalar FP register file 1245

Control register(s) 1255

Vector/SIMD registers 1210

Debug registers 1250

General purpose registers 1225

Mem. management registers 1265

Flag register(s) 1240

Machine check registers 1260

FIG. 12

| Prefix(es) 1301 | Opcode 1303 | Addressing 1305 | Displacement 1307 | Immediate 1309 |

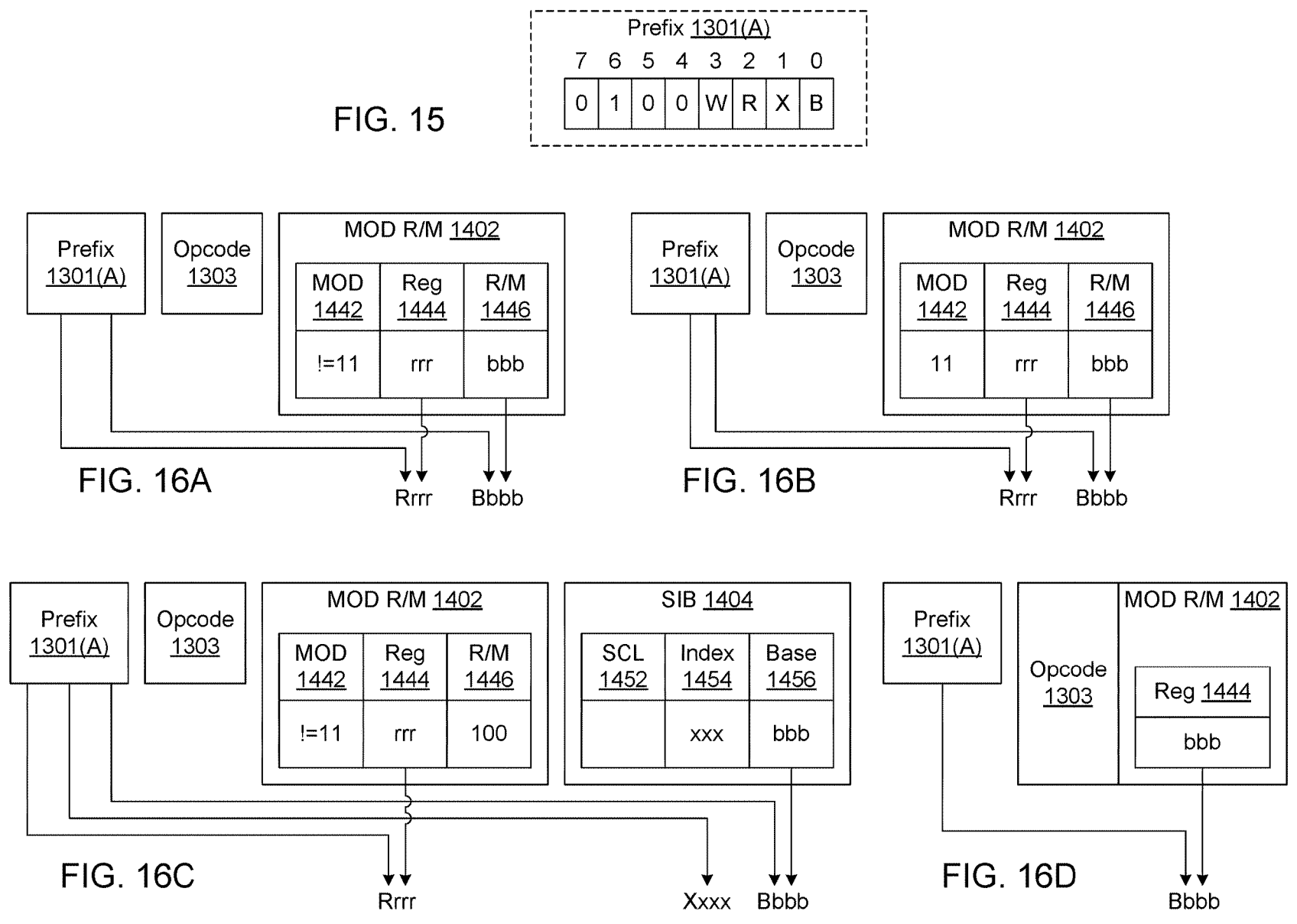

| Prefix 1301(A) | | | | | | | |
|---|---|---|---|---|---|---|---|
| 7 | 6 | 5 | 4 | 3 | 2 | 1 | 0 |
| 0 | 1 | 0 | 0 | W | R | X | B |

FIG. 16A

Prefix 1301(A) → Opcode 1303 → MOD R/M 1402

| MOD 1442 | Reg 1444 | R/M 1446 |
|---|---|---|
| !=11 | rrr | bbb |

→ Bbbb
→ Rrrr

FIG. 16B

Prefix 1301(A) → Opcode 1303 → MOD R/M 1402

| MOD 1442 | Reg 1444 | R/M 1446 |
|---|---|---|
| 11 | rrr | bbb |

→ Bbbb
→ Rrrr

FIG. 16C

Prefix 1301(A) → Opcode 1303 → MOD R/M 1402

| MOD 1442 | Reg 1444 | R/M 1446 |
|---|---|---|
| !=11 | rrr | 100 |

SIB 1404

| SCL 1452 | Index 1454 | Base 1456 |
|---|---|---|
| | xxx | bbb |

→ Bbbb
→ Xxxx
→ Rrrr

FIG. 16D

Prefix 1301(A) → Opcode 1303 → MOD R/M 1402

| Reg 1444 | |
|---|---|
| | bbb |

→ Bbbb

ALLOCATION OF ACCESS TO A CHIPLET ACROSS AN INTERCONNECT SWITCH

BACKGROUND

1. Technical Field

This disclosure generally relates to distributed computation and more particularly, but not exclusively, to an allocation of access to a processor chiplet via a switch.

2. Background Art

Compute Express Link (CXL) is an open standard interconnect for high-speed central processing unit (CPU) to device and CPU-to-memory communications, designed to accelerate next-generation data center performance. CXL is built upon the Peripheral Component Interconnect express (PCIe) physical and electrical interface specification (conforming to version 3.0 or other versions of the PCIe standard published by the PCI Special Interest Group (PCI-SIG)) with protocols in three areas: input/output (I/O), memory and cache coherence.

There are three memory device types defined in CXL: Type 1, Type 2, and Type 3. A Type 1 CXL device implements a fully coherent cache but no host-managed device memory, extends the PCIe protocol capability (for example, atomic operation), may need to implement a custom ordering model, and includes applicable transaction types of device-to-host (D2H) coherent and host-to-device (H2D) snoop transactions. A Type 2 CXL device implements an optional coherent cache and host-managed device memory. Typical applications for Type 2 are devices which have high-bandwidth memories attached. Applicable transaction types for Type 2 are all CXL.cache/mem transactions. A Type 3 CXL device only has host-managed device memory. A typical application for Type 3 is a memory expander for the host. Applicable transaction type for Type 3 include CXL.mem, memory read (MemRd) and memory write (MemWr) transactions.

BRIEF DESCRIPTION OF THE DRAWINGS

The various embodiments of the present invention are illustrated by way of example, and not by way of limitation, in the figures of the accompanying drawings and in which:

FIG. 2A is a flow diagram illustrating features of a method for an IC chip to access a chiplet resource of another IC chip via a CXL switch, according to an embodiment.

FIG. 2B is a flow diagram illustrating features of a method for a CXL switch to provide an IC chip with access to a chiplet resource of another IC chip according to an embodiment.

FIG. 3A is a functional block diagram illustrating features of a processor which is to provide, or receive, access to a chiplet via a CXL switch according to an embodiment.

FIG. 4A-4C are tables each illustrating an example of respective information which is communicated to facilitate an allocation of a chiplet resource via a switch according to a corresponding embodiment.

FIG. 6 is a functional block diagram illustrating communications by a system to provide access to a chiplet resource according to an embodiment.

FIG. 7 is a functional block diagram illustrating features of a port comprising a layered stack to facilitate an allocation of chiplet resources according to an embodiment.

FIG. 9 illustrates a block diagram of an example processor that may have more than one core and an integrated memory controller.

FIG. 12 is a block diagram of a register architecture according to some examples.

FIG. 13 illustrates examples of an instruction format.

FIG. 15 illustrates examples of a first prefix.

FIGS. 16A-D illustrate examples of how the R, X, and B fields of the first prefix in FIG. 15 are used.

DETAILED DESCRIPTION

Figure 1:
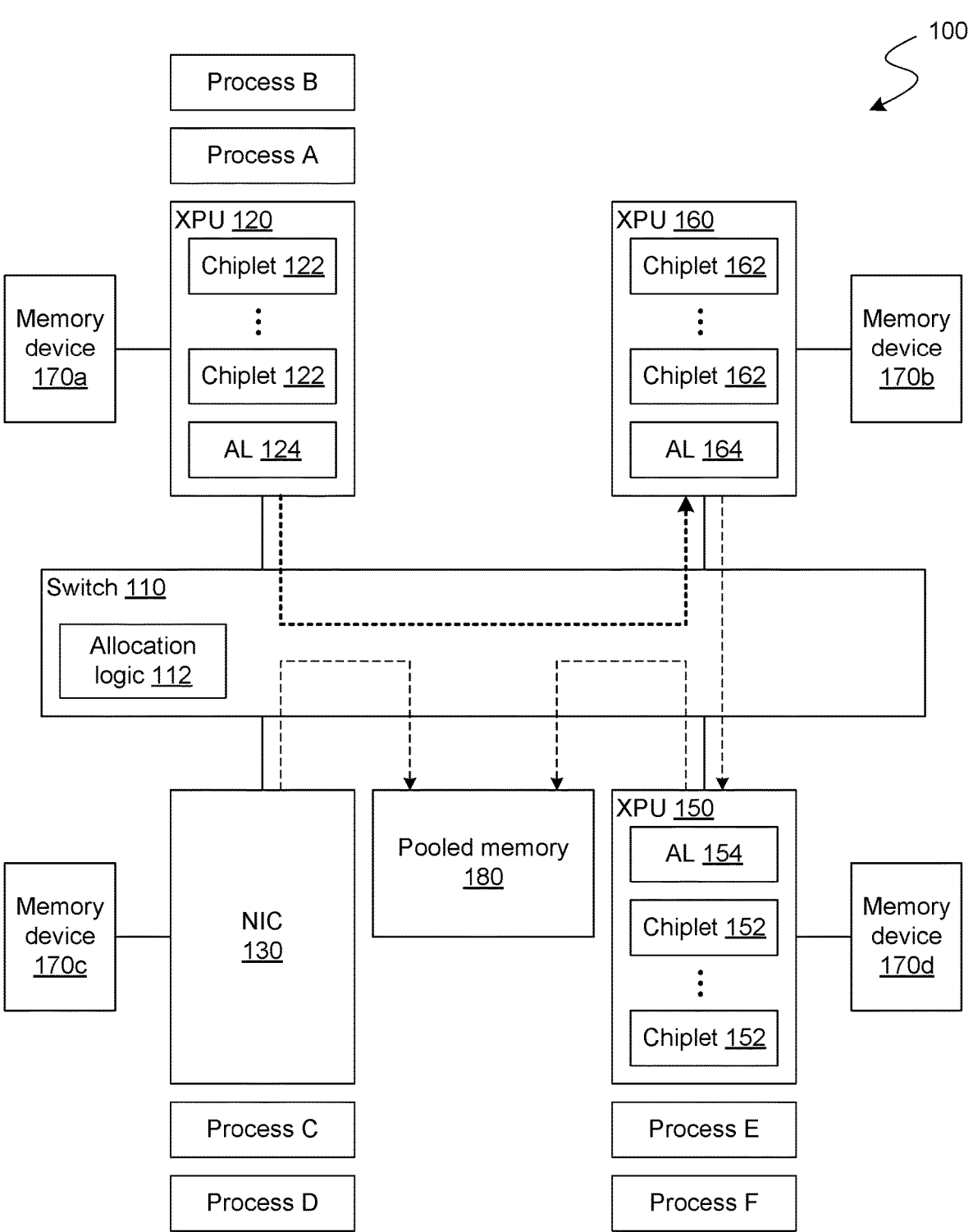
FIG. 1 is a functional block diagram illustrating features of a system which supports an accessing of chiplet resources via a switch according to an embodiment.

Embodiments discussed herein variously provide techniques and mechanisms to enable a selective inclusion of a chiplet resource in a dynamically composed (sub)system. In various embodiments, a chiplet resource of one integrated circuit (IC) chip (or "chip" herein) is allocated to be accessible to one or more processor cores of another IC chip via a network switch that, in some embodiments, supports a Compute Express Link (CXL) communication link. Such allocation of a chiplet resource is provided at any of various other sub-processor levels of granularity—e.g., at a chiplet level of granularity, or a sub-chiplet level of granularity.

By contrast, existing CXL-based technologies are able to support certain types of resource sharing only at a chip level (e.g., a processor level) of granularity. Additionally or alternatively, these existing CXL-based technologies variously provide non-exclusive resource sharing wherein a cache, accelerator or other circuit resource which is local to one chip is allocated to be concurrently accessible by any of one or more processor cores of that local processor, and one or more processor cores of a remote chip which is coupled thereto.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including circuitry to support an allocation of a chiplet resource to a processor.

Certain features of various embodiments are described herein with reference to multiple IC chips which are coupled to each other via a switch device, wherein at least one of the multiple chips is a composite chip. As used herein, "composite chip" (sometimes called a "heterogeneous chip") refers to a type of chip structure which composes at least one chiplet which is distinct from a host chip of the composite chip, and/or from one or more other chiplets of the composite chip. A "chiplet" or "micro-chiplet" is a singulated die that has a smaller footprint than that of a composite chip of which that chiplet is a component. By way of illustration and not limitation, in one example embodiment, a composite chip comprises a host chip(let) and one or more IC chiplets that are variously embedded within back-end-of-line (BEOL) metallization layers on the host IC chip(let). However, some embodiments are not limited to a particular arrangement of one or more chiplets in a given composite chip. The term "BEOL" generally refers to wafer-level monolithic fabrication operations performed after the formation of the active and passive devices within a device layer during front-end of-line (FEOL) processing. BEOL processing generally entails a series of operations where metal features (metallization) are defined within dielectric material layers to route connections between active devices. BEOL processing generally has feature pitches much smaller than a feature pitch of interconnects that couple an IC chip to some host component (e.g., interposer or package substrate). In various embodiments, a composite chip—in addition to providing features variously described herein—provides functionality such as that of any of various system on chip (SOC) devices.

In various embodiments, multiple chips variously support communication with a switch, each via a respective link that is compatible with a link standard which is defined or otherwise identified in a Compute Express Link (CXL) specification. In some embodiments, the CXL specification is any of various specifications released by the CXL Consortium of Beaverton, OR, USA. Such specifications include, but are not limited to, the CXL Specification 3.0, released Aug. 2, 2022 by the CXL Consortium, the CXL Specification 2.0, released Nov. 10, 2020 by the CXL Consortium, the CXL Specification 1.0 released Mar. 11, 2019 by the CXL Consortium, or the like. In various embodiments, the CXL specification defines or otherwise identifies a protocol CXL.io which provides a non-coherent load/store interface for I/O devices—e.g., wherein the CXL.io protocol includes features identified in the Peripheral Component Interconnect Express (PCIe) 5.0 specification. Alternatively or in addition, the CXL specification defines or otherwise identifies a protocol CXL.cache which enables interactions between a host device and an agent device, and which supports a coherency of cached data. Alternatively or in addition, the CXL specification defines or otherwise identifies a protocol CXL.mem which supports communications between a processor and a memory. In one such embodiment, the CXL specification identifies a Type 1 of devices which communicate using the CXL.io and CXL-.cache protocols, a Type 2 of devices which communicate using the CXL.io, CXL.cache, and CXL.mem protocols, and a Type 3 of devices which communicate using the CXL.io, and CXL.mem protocols.

In various embodiments, a switch allocates a resource of a given chiplet (a "chiplet resource" herein) to be accessible by one chip of multiple chips which are each coupled to the switch. For example, a chiplet resource of a first composite chip is made available, via the switch, to one or more processor cores of a second chip (e.g., another composite chip). Alternatively or in addition, the switch provides functionality to selectively disable, and (re)enable an accessibility of the chiplet resource to one or more processor cores of that same first composite chip.

In some embodiments, a switch allocates a chiplet resource based on some or all of the multiple chips each providing respective capability information to the switch. In this context, "capability information" refers herein to information which describes a corresponding chip, wherein the capability information identifies a hardware resource of the chip, and a functionality which that hardware resource provides. In one such embodiment, capability information is received from, and describes, a corresponding composite chip—e.g., wherein the capability information identifies a particular chiplet of the composite chip, and a particular functionality which a resource of said chiplet is able to provide. In some embodiments, a chiplet resource is the entire chiplet in question, which is allocated at a "chiplet level of granularity." Alternatively, a chiplet resource is only a subset of all circuit resources of said chiplet, and is allocated at a "sub-chiplet level of granularity."

FIG. 1 shows a system 100 which supports an accessing of chiplet resources via a switch according to an embodiment. System 100 illustrates one example of an embodiment wherein a switch is coupled between two integrated circuit (IC) chips, at least one of which is a composite chip comprising multiple chiplets. The switch and the IC chips variously support communications whereby one IC chip is allocated access to a chiplet resource of the other IC chip. In various embodiments, such communications are via a link which is compatible with a link standard which is defined or otherwise identified in a CXL specification. In one such embodiment, a first IC chip is allocated access to a chiplet resource of a second IC chip, wherein said allocation disables access to the chiplet resource by some or all processor cores of the second IC chip.

As shown in FIG. 1, system 100 comprises an arrangement of multiple processors—e.g., including the illustrative XPUs 120, 150, 160 shown—which are implemented (for example) each with a different respective chip such as on in a data center architecture any of various other suitable architectures. For example, XPUs 120, 150, 160 each include a respective one of a central processing unit (CPU), a graphics processing unit (GPU), an intelligence processing unit (IPU), or the like. In one such embodiment, XPUs 120, 150, 160 are coupled to each other via a switch 110 to provide a collection of components which (for example) implement at least in part one or more servers of a data center. Although some embodiments are not limited in this regard, switch 110 is further coupled to facilitate communication between some or all of XPUs 120, 150, 160 and one or more other components—e.g., wherein the one or more components comprise the illustrative network interface card (NIC) 130 shown. Alternatively or in addition, XPUs 120, 150, 160, and NIC 130 are each coupled to, or include, a different respective one of memory devices 170a-170d, although some embodiments are not limited in this regard. Circuits of XPUs 120, 150, 160 and NIC 130 variously perform a respective software (or other) processes—e.g., including the illustrative processes A through F shown.

Some or all of XPUs 120, 150, 160 each are, or otherwise include, a respective composite IC chip. By way of illustration and not limitation, XPU 120 is, or otherwise includes, a composite chip which comprises multiple chiplets 122 (which, for example, are coupled to—or include—a host chip of XPU 120). Alternatively or in addition, a chip of XPU 150 comprises multiple chiplets 152—e.g., wherein a chip of XPU 160 similarly comprises multiple chiplets 162. In some embodiments, a given one or more chiplets of XPUs 120, 150, 160 each include a respective circuit resource which switch 110 is to selectively make available for access by one or more processor cores of XPUs 120, 150, 160. In one embodiment, such a chiplet resource provides functionality of an accelerator, of a cache, and/or any of various other existing IP blocks—e.g., wherein said functionality is other than that of a processor core. However, some embodiments are not limited with respect to a particular (non-core) functionality which is provided by such a chiplet resource.

In various embodiments, two or more of XPUs 120, 150, 160 are each in a different respective packaged device. Additionally or alternatively, two or more of XPUs 120, 150, 160 are each implemented as a different respective chip of the same packaged device—e.g., wherein another chip (or chiplet) of the packaged device comprises switch 110. However, some embodiments are not limited with respect to whether or how a given two processors of system 100 might be in the same packaged device.

Some embodiments variously provide a functionality—e.g., which supplements that provided according to existing CXL techniques—to dynamically compose a subsystem of system 100 by allocating one or more chiplet resources to be accessible by one or more processor cores of an IC chip. In one such embodiment, said allocation disables access to those same one or more chiplet resources by one or more processor cores of another IC chip. In an illustrative scenario according to one embodiment, a resource at a chiplet of a first chip is allocated to be accessible to one or more cores of a second chip, wherein the chiplet resource is inaccessible to some or all cores of the first chip during said allocation.

For example, in various embodiments, switch 110 is a CXL switch which acts as a fabric (or other suitable networking device) to facilitate communications via one or more links each with a different respective one of XPUs 120, 150, 160 and NIC 130. These one or more links are each compatible with a link standard which is defined or otherwise identified in a CXL specification. In one such embodiment, switch 110 comprises allocation logic 112 which facilitates operations to allocate a chiplet resource of one of XPUs 120, 150, 160 for access to a processor core of another one of (or, in some embodiments, the same one of) XPUs 120, 150, 160. Allocation logic 112 comprises a programmable gate array (PGA), an application specific integrated circuit (ASIC) and/or any of various other circuit resources which are suitable to participate in communications via a CXL link.

In various embodiments, communication via the CXL link is based on any of various security mechanisms including, but not limited to, the use of an attestable cryptographic key that is generated or derived from a root-of-trust—e.g., using a Device Identity Composition Engine (DICE) or any of various other suitable types of hardware logic. For example, such a cryptographic key is used to sign attestation evidence that describes the composition and/or configuration of a CXL endpoint device. In one such embodiment, use of a cryptographic key to authenticate a CXL device is understood—e.g., by a CXL switch and/or by one or more other CXL endpoint devices—as proof of a proper composition and/or configuration of the CXL endpoint in question.

In the example embodiment shown, XPU 120 comprises allocation logic (AL) 124, circuitry of which supports communication with allocation logic 112 via a CXL link. Chiplets 122 and/or other hardware logic of XPU 120 comprises circuitry which, for example, is operable to provide to allocation logic 112 capability information which describes one or more resources of chiplets 122. In various embodiments, at least some of AL 124 is implemented with an input/output (IO) interface of XPU 120. Alternatively or in addition, some of AL 124 is implemented with respective circuit structures of chiplets 122.

Similarly, XPU 150 comprises allocation logic (AL) 154 which supports communication with allocation logic 112 via another CXL link. XPU 150 comprises circuitry which provides to allocation logic 112 capability information for one or more resources each of a respective one of chiplets 152—e.g., wherein said capability information is to be communicated to allocation logic 112. In an embodiment, at least some of AL 154 is implemented with an input/output (IO) interface of XPU 150. Alternatively or in addition, at least some of AL 154 is implemented with respective circuit structures of chiplets 152.

Similarly, XPU 160 comprises allocation logic (AL) 164 which supports communication with allocation logic 112. XPU 160 comprises circuitry which provides to allocation logic 112 capability information for one or more resources each of a respective one of chiplets 162—e.g., wherein said capability information is to be communicated to allocation logic 112. In an embodiment, at least some of AL 164 is implemented with an input/output (IO) interface of XPU 160. Alternatively or in addition, at least some of AL 164 is implemented with respective circuit structures of chiplets 162.

In various embodiments, allocation logic 112—and two or more of AL 124, AL 154, and AL 164—variously support a protocol—referred to herein with the label "CXL.chiplet"—which is supplemental to, or otherwise distinguished from, existing CXL protocols such as CXL.cache, CXL.mem, and CXL.io. In one such embodiment, the CXL.chiplet protocol enables a composite chip (comprising a processor, for example) to communicate to a switch capability information which includes an identifier of a chiplet of that composite chip, and an indicator of a resource of that chiplet. For example, the indicator of the resource is, or otherwise includes, an identifier of a functionality which that resource can provide (e.g., the identifier provided as attestation evidence information as described herein). In some embodiments, a description of a composition and/or configuration of the composite chip is similarly provided as attestation evidence information such as that described herein. In an illustrative scenario according to one embodiment, AL 124 uses the CXL.chiplet protocol to provide to allocation logic 112 first capability information which identifies a particular one of chiplets 122, and a functionality which is provided with some or all of that one of chiplets 122. Alternatively or in addition, AL 154 provides to allocation logic 112 second capability information which identifies a particular one of chiplets 152, and a functionality which is provided with some or all of that one of chiplets 152. Alternatively or in addition, AL 164 provides to allocation logic 112 third capability information which identifies a particular one of chiplets 162, and a functionality which is provided with some or all of that one of chiplets 162. Based on such capability information, allocation logic 112 generates an inventory of one or more chiplet resources which are available to be selectively allocated for use by a given one of XPUs 120, 150, 160.

Additionally or alternatively, the CXL.chiplet protocol enables a switch to advertise, to one or more chips which are coupled thereto, an availability of one or more chiplet resources which are each currently available for allocation (e.g., an exclusive allocation) to a given chip. For example, switch 110 uses the CXL.chiplet protocol to specify or otherwise indicate to one or more of AL 124, AL 154, and AL 164 one or more functionalities which are variously available each to be provided with a respective chiplet resource that is represented in the inventory.

Additionally or alternatively, the CXL.chiplet protocol enables a chip to send to the switch a request for an allocation of a chiplet resource (e.g., wherein the chip provides a generic request for an allocation of an advertised functionality). In an illustrative scenario according to one embodiment, AL 124 provides to allocation logic 112 a request to access an accelerator functionality, a memory functionality, a cache functionality, or the like—e.g., wherein, based on the request, allocation logic 112 accesses the inventory of currently available chiplet resources to identify a resource of a particular chiplet as being able to provide the requested functionality.

Additionally or alternatively, the CXL.chiplet protocol enables the switch to provide to the "requestor chip" (which, in this context, refers to the chip which requests the allocation of a chiplet resource) an allocation of an available chiplet resource. As used herein, "target chip" refers to a chip which includes the chiplet resource that is allocated to the requestor chip based on the request. In an embodiment, the allocation of a chiplet resource comprises the switch communicating information which configures a protocol stack (and/or other suitable hardware logic or software logic) of the requestor chip. Alternatively or in addition, such allocation comprises the switch communicating other information which configures a protocol stack (and/or other suitable hardware logic or software logic) of the target chip.

For example, in an illustrative scenario according to one embodiment, AL 124 provides to switch 110 a request that XPU 120 be allocated a chiplet resource which provides some first functionality (such as that of an accelerator circuit). Based on the request, allocation logic 112 accesses an inventory of available chiplets and determines (for example) that a resource of one of chiplets 162 is available to provide said first functionality. Based on such determining, allocation logic 112 allocates the resource of chiplets 162 to the requestor chip of XPU 120—e.g., by signaling AL 124 to configure a first protocol stack (and/or other suitable logic) of the requestor chip. In one such embodiment, the first protocol stack is configured to route to switch 110 messages which target the allocated resource of chiplets 162. Alternatively or in addition, the first protocol stack is configured to route to a processor core (or other suitable hardware) of the requestor chip messages which are communicated, via the switch, from the allocated resource of chiplets 162.

In one such embodiment, allocation of the resource of chiplets 162 to the requestor chip of XPU 120 further comprises allocation logic 112 signaling AL 164 to configure a second protocol stack (and/or other suitable logic) of the target chip of XPU 160. In one such embodiment, the second protocol stack is configured to route to switch 110 messages from the allocated resource of chiplets 162. Alternatively or in addition, the second protocol stack is configured to route, to the allocated resource of chiplets 162, messages which are communicated, via switch 110, from a processor core (or other suitable hardware) of the requestor chip of XPU 120. Alternatively or in addition, the second protocol stack (or other suitable logic of XPU 160) is configured to prevent messages from some or all processor cores of the target chip from being communicated to the allocated resource of chiplets 162. For example, based on such configuration, a message from a core of the target chip to the allocated chiplet resource results in an interrupt, a software error, or other such event at XPU 160.

In various embodiments, the CXL.chiplet protocol further enables the deallocation of a chiplet resource after some predetermined event—e.g., after a completion of a workload with the requestor chip and/or after an expiration of some predetermined threshold period of time. For example, deallocation of the chiplet resource includes one or more operations which are reciprocal to those which were performed previously to allocate the chiplet resource. In one such embodiment, allocation logic 112 variously signals AL 124 and AL 164 to (re)configure the first protocol stack of XPU 120 and the second protocol stack of XPU 160—e.g., to disable at least some communications between the requestor chip which includes XPU 120 and the deallocated resource of chiplets 162 via switch 110. In some embodiments, deallocation further comprises the second protocol stack (and/or other suitable logic) of XPU 160 being (re)configured to reenable at least some communications between one or more cores of XPU 160 and the deallocated resource of chiplets 162.

In the example embodiment shown, messages variously communicated among switch 110 and XPUs 120, 160—e.g., the messages according to the CXL.chiplet protocol—enable a processor core of XPU 120 (for example, where the core is at a host chip of XPU 120, or at one of chiplets 122) to receive an allocation of access to a particular chiplet resource of one of chiplets 162. Such allocation is at a chiplet level of granularity or, for example, at a sub-chiplet level of granularity. Alternatively or in addition, of the XPUs 120, 150, 160 and NIC 130 of system 100, the allocation is exclusive to XPU 120—e.g., wherein any processor core(s) of XPU 160 are unable to access the chiplet resource of chiplets 162 while it is allocated to XPU 120.

By contrast, messages variously communicated among switch 110 and XPUs 150, 160—e.g., the messages according to one or more conventional CXL protocols—enable a processor core of XPU 160 to be allocated access to XPU 150. Such allocation is at a chip level (e.g., a processor level) of granularity, for example. Additionally or alternatively, an allocated (non-core) resources of XPU 150 is concurrently available for access be any of one or more cores of XPU 160 and one or more cores of XPU 150. Although some embodiments are not limited in this regard, still other messages variously communicated among switch 110, XPU 160 and NIC 130—e.g., the messages according to one or more conventional CXL protocols—enable XPU 160 and NIC 130 (for example) to be allocated access to a pooled memory 180.

In various embodiments, switch 110 verifies attestation evidence and/or verifies the use of an attestable cryptographic key by one or more CXL endpoints—e.g., wherein said verification is a condition of allowing access to a given chiplet resource (such as pooled memory 180 or the like). In one such embodiment, switch 110 operates as a fabric which facilitates trust enforcement for various pooled (or other) chiplet resources. For example, an availability of a pool of memory resources is conditional on an achieved level of trust among all of those endpoints that provide or consume the pooled resource.

FIG. 2A shows a method 200, at an IC chip, to access a chiplet resource which is allocated by a CXL switch, according to an embodiment. Method 200 illustrates one example of an embodiment wherein a chip communicates with a switch via a CXL link—e.g., using a CXL.chiplet protocol as described herein—to specify or otherwise indicate the allocation of a functionality which is provided with a chiplet. In some embodiments, the allocation is based on a communication of capability information which identifies the chiplet, and which specifies or otherwise indicates a particular functionality which is provided by a resource of the chiplet. Additionally or alternatively, the allocation is to enable an access to the chiplet resource which is exclusive to one chip of multiple chips which are coupled to each other via the switch. In one illustrative embodiment, method 200 is performed by one of XPUs 120, 150, 160 (for example).

As shown in FIG. 2A, method 200 comprises (at 210) providing first capability information from a first chip (which performs method 200) to a switch. In an embodiment, the first capability information comprises an identifier of a first chiplet of the first chip, and an identifier of a first functionality which is provided by a circuit resource of the first chiplet. For example, the providing at 210 comprises AL 124 (or other suitable hardware logic of XPU 120) communicating to switch 110 information which identifies a particular one of chiplets 122, and which further identifies that a resource of said chiplet provides a particular one of an accelerator functionality, a cache functionality, a storage functionality, or the like. In some embodiments, the first capability information further specifies or otherwise indicates one or more other characteristics of the functionality which the chiplet resource is capable of providing. By way of illustration and not limitation, the first capability information indicates a quality of service according to which the chiplet resource can satisfy in provisioning the functionality. Alternatively or in addition, the first capability information indicates an amount of time during which the chiplet resource can provide the functionality.

In various embodiments, the switch generates an inventory of chiplet resources based on the first capability information which is provided at 210—e.g., wherein the inventory is compiled or otherwise generated further based on one or more other chips each providing different respective capability information to the switch. For example, the inventory includes or otherwise represents a list of functionalities which are currently available to be allocated each by any one of a different respective one or more chiplet resources.

In one such embodiment, method 200 further comprises (at 212) receiving from the switch an advertisement of an availability of multiple chiplets—e.g., wherein the advertisement is based on said inventory of chiplets. Based on the advertisement which is received at 212, method 200 (at 214) provides—from the first chip to the switch via a CXL link—a request to access a functionality of the multiple chiplets, wherein the switch accesses the inventory based on the request to identify a second chiplet of a second chip. In an illustrative scenario according to one embodiment, a software process—e.g., an operating system, application, virtual machine, hypervisor, or the like—or other suitable agent (which is provided with a processor core of XPU 120), determines that an expected workload will require or otherwise benefit from a functionality which is not currently accessible to some or all processor cores of XPU 120. Based on such a determination, the agent signals AL 124 to a request an allocation of the functionality by allocation logic 112.

Method 200 further comprises (at 216) receiving from the switch an allocation of a resource of the second chiplet, wherein the allocation is based on the request that is provided at 214. In various embodiments, the receiving at 216 comprises allocation logic 112 (for example) signaling AL 124 to configure a protocol stack (or other suitable logic) of XPU 120. Configuring the protocol stack results in a processor core of XPU 120 being able to access a chiplet resource of one of XPUs 120, 150, 160—e.g., wherein respective processor cores of the others of XPUs 120, 150, 160 are prevented from accessing said chiplet resource.

In various embodiments, access to a chiplet resource—by a requestor chip which has been allocated the chiplet resource—includes, or otherwise facilitates, a communication of telemetry information between the requestor chip and the chiplet resource. For example, such access includes the requestor chip providing, to the chiplet, first telemetry information which describes operational characteristics of the requestor chip. Additionally or alternatively, such access includes the chiplet resource providing, to the requestor chip, second telemetry information which describes operational characteristics of the chiplet resource. In one such embodiment, one of the requestor chip or the chiplet resource signals the other of the requestor chip or the chiplet resource to prevent access to some or all such telemetry information by other circuit logic (such as one or more cores of the target chip and/or one or more other chiplets of the target chip).

In various embodiments, access to the chiplet resource by the requestor chip additionally or alternatively includes, or otherwise facilitates, a communication of attestation information between the requestor chip and the chiplet resource. For example, such access is to communicate information by which an allocated chiplet, or at least a resource thereof, provides to the requestor chip a proof of identity of the chiplet (or, for example, of another chiplet)—e.g., wherein the requestor chip connects to a trusted server or other suitable agent to verify the proof of identity. Additionally or alternatively, such access is to communicate information by which the requestor chip provides to the chiplet resource a proof of identity of the requestor chip.

Although some embodiments are not limited in this regard, method 200 comprises additional operations to subsequently change whether and/or how one or more chiplet resources are variously allocated each to a respective chip of a system (such as system 100) which includes that first chip that performs method 200. For example, method 200 further comprises (at 218) the first chip performing a workload with the second chiplet, wherein the performing is based on the allocation received at 216. Method 200 further comprises (at 220) the first chip receiving a deallocation of the resource of the second chip, wherein the deallocation is received after a completion of the workload which is performed at 218. For example, the deallocating at 220 includes or is otherwise based on the first chip signaling to the switch that the workload has been completed. Alternatively or in addition, the deallocating at 220 is based on the occurrence of some predetermined event such as the completion of a predetermined period of time that the chiplet resource was to be allocated to the first chip. In an example embodiment, the receiving at 220 comprises allocation logic 112 (for example) signaling AL 124 to the protocol stack (or other suitable logic) of XPU 120, which results in a processor core of XPU 120 being disabled from accessing a chiplet resource of one of XPUs 120, 150, 160. In one such embodiment, the deallocating includes, or is performed in combination with, one or more processor cores of another of XPUs 120, 150, 160 being enabled to access said chiplet resource.

FIG. 2B shows a method 250 which is performed at a switch for providing an IC chip with access to a chiplet resource (such as that of another IC chip), according to an embodiment. Method 250 illustrates one example of an embodiment—to be performed, for example, in combination with method 200—which facilitates an allocation of a chiplet resource to a chip which is coupled to a switch via a CXL link. In one example embodiment, method 250 is performed by switch 110 (for example).

As shown in FIG. 2B, method 250 comprises (at 260) receiving, at the CXL switch, first capability information from a first chip, and second capability information from a second chip. In an embodiment, the first capability information (for example) is that which is communicated from the first switch at 210—e.g., wherein two or more of XPUs 120, 150, 160 provide the first capability information and second capability information to switch 110.

Based on the first capability information and the second capability information which are received at 260, method 250 (at 262) generates an inventory of chiplets which are each available to provide a respective resource for allocation. By way of illustration and not limitation, allocation logic 112 creates, updates or otherwise accesses a table, list and/or any of various other suitable data structures which represents the available chiplet resources. In one such embodiment, the inventory comprises items (table entries, for example) which each correspond to a different respective chiplet resource—e.g., wherein each such item identifies a respective chiplet, and a respective functionality which is provided by a resource of said chiplet. Based on the inventory generated at 262, method 250 (at 264) advertises an availability of the multiple chiplets—e.g., wherein the switch provides to each of one or more chips (such as chips of XPUs 120, 150, 160) a respective communication which identifies one or more functionalities as being available for allocation.

Method 250 further comprises (at 266) receiving, from the first chip via a CXL link, a request to access a functionality of the multiple chiplets. For example, the request received at 266 is that which is provided to the switch at 214. Based on the request received at 266, method 250 (at 268) provides to the first chip an allocation of a resource of a second chiplet of the second chip. In an alternative embodiment, the first chip is instead allocated a chiplet resource of the first chip itself—e.g., wherein the switch enables a processor core of the first chip to have a previously disabled access to a resource of the first chiplet.

Although some embodiments are not limited in this regard, method 250 further comprises (at 270) the switch communicating a signal between the first chip and the second chip based on the allocation—e.g., wherein the signal facilitates an access to the allocated chiplet resource by a core of the first chip. For example, while the chiplet resource is allocated to the first chip, the first chip performs a workload at least in part by accessing the chiplet resource via the switch. After a completion of the workload, method 250 (at 272) deallocates the second chiplet from the first chip.

FIG. 3A shows a processor 300 which is to provide, or receive, access to a chiplet via a CXL switch according to an embodiment. Processor 300 illustrates one example of an embodiment which supports a protocol that facilitates an enumeration of chiplet resources and their respective functionalities, that further facilitates the requesting of a functionality that is provided by a chiplet resource, and that further facilitates the configuration of a protocol stack (or other suitable logic) to route communications which are variously to and/or from an allocated chiplet resource. For example, processor 300 provides functionality of one of XPUs 120, 150, 160—e.g., wherein processor 300 performs operations of method 200.

Processor 300 is implemented at a composite chip which comprises one chiplet, as well as a host chip and/or one or more other chiplets coupled to the one chiplet. For example, a host chip (for example) comprises one or more processor cores 302 of processor 300, wherein the one or more cores 302 are to execute any of various operating systems, applications, hypervisors, virtual machines and/or other software processes. The host chip (or chiplet) which comprises the one or more cores 302 is coupled to one or more chiplets of processor 300—e.g., wherein the one or more chiplets are variously formed in or on BEOL structures on the host chip.

In the example embodiment shown, processor 300 comprises a chiplet 310 which is (or otherwise includes) a circuit resource that provides a data streaming accelerator (DSA) functionality. Alternatively or in addition, processor 300 comprises a chiplet 320, a circuit resource of which provides artificial intelligence (AI) functionality. Alternatively or in addition, processor 300 comprises a chiplet 330, a circuit resource of which provides functionality—such as that of a QuickAssist Technology (QAT) from Intel Corporation of Santa Clara, California—to accelerate data encryption and/or data compression. Alternatively or in addition, processor 300 comprises a 5G AC chiplet 340, a circuit resource of which provides a 5G AC communication functionality that (for example) is compatible with an IEEE 802.11ac standard from the Institute of Electrical and Electronics Engineers. However, some embodiments are not limited to a particular number and/or type of chiplets that may be provided by a composite chip that includes processor 300.

Processor 300 further comprises circuitry—e.g., including the illustrative high bandwidth input/output (I/O) 304 shown—which facilitates communication between some or all of one or more cores 302 and chiplets 310, 320, 330, 340, and a connector 306 by which processor 300 is to be coupled to, and communicate with, a switch (such as switch 110, for example). Connector 306 comprises circuitry to implement or otherwise support a protocol stack (or other suitable hardware logic and/or hardware logic) which facilitates operation of a switch to allocate a chiplet resource. In an embodiment, allocation of a chiplet resource is based on capability information which describes a functionality of the chiplet resource.

For example, processor 300 is configured to provide capability information for a given chiplet, wherein the capability information includes an identifier of the given chiplet, and further specifies or otherwise indicates, for each of one or more circuit resources of the given chiplet, a respective functionality which the resource is able to provide. By way of illustration and not limitation, capability information 312 includes an identifier of DSA chiplet 310, and specifies or otherwise indicates, for each of one or more circuit resources of DSA chiplet 310, a respective functionality which is provided with that resource. Alternatively or in addition, capability information 322 identifies AI chiplet 320 and describes functionality of AI chiplet 320—e.g., wherein capability information 332 identifies QAT chiplet 330 and describes functionality of QAT chiplet 330, and/or capability information 342 identifies 5G AC chiplet 340 and describes functionality of 5G AC chiplet 340. In the example embodiment shown, DSA chiplet 310, AI chiplet 320, QAT chiplet 330, and 5G AC chiplet 340 are the respective repositories of capability information 312, capability information 322, capability information 332, and capability information 342. However, some embodiments are not limited with respect to which particular component(s) of processor 300 are to store capability information for a given chiplet.

In some embodiments, connector 306 comprises circuitry (CXL.chiplet.offer) to support CXL.chiplet protocol messaging with which capability information is accessed and communicated to a CXL switch—such as switch 110—which is to be coupled to processor 300 via connector 306. In one such embodiment, communication of the capability information serves as an offer to make chiplet resources of processor 300 available for allocation by the CXL switch. Alternatively or in addition, connector 306 comprises circuitry (CXL.chiplet.discover) to support CXL.chiplet protocol messaging for discovering—e.g., for receiving an advertisement of—chiplet resource functionalities which are available to be allocated by the CXL switch. Alternatively or in addition, connector 306 comprises circuitry (CXL.chiplet.reserve) to support CXL.chiplet protocol messaging with which connector 306 requests that a particular chiplet resource functionality be allocated by the CXL switch to one or more cores 302 (and/or other suitable circuitry) of processor 300. Alternatively or in addition, connector 306 comprises circuitry (CXL.chiplet.create_dynamic_SoC) to support CXL.chiplet protocol messaging with which a protocol stack and/or other suitable logic of processor 300 is configured to enable access by processor 300 to a chiplet resource (and/or to enable another chip to access a chiplet resource of processor 300 via the CXL switch).

Figure 3B:
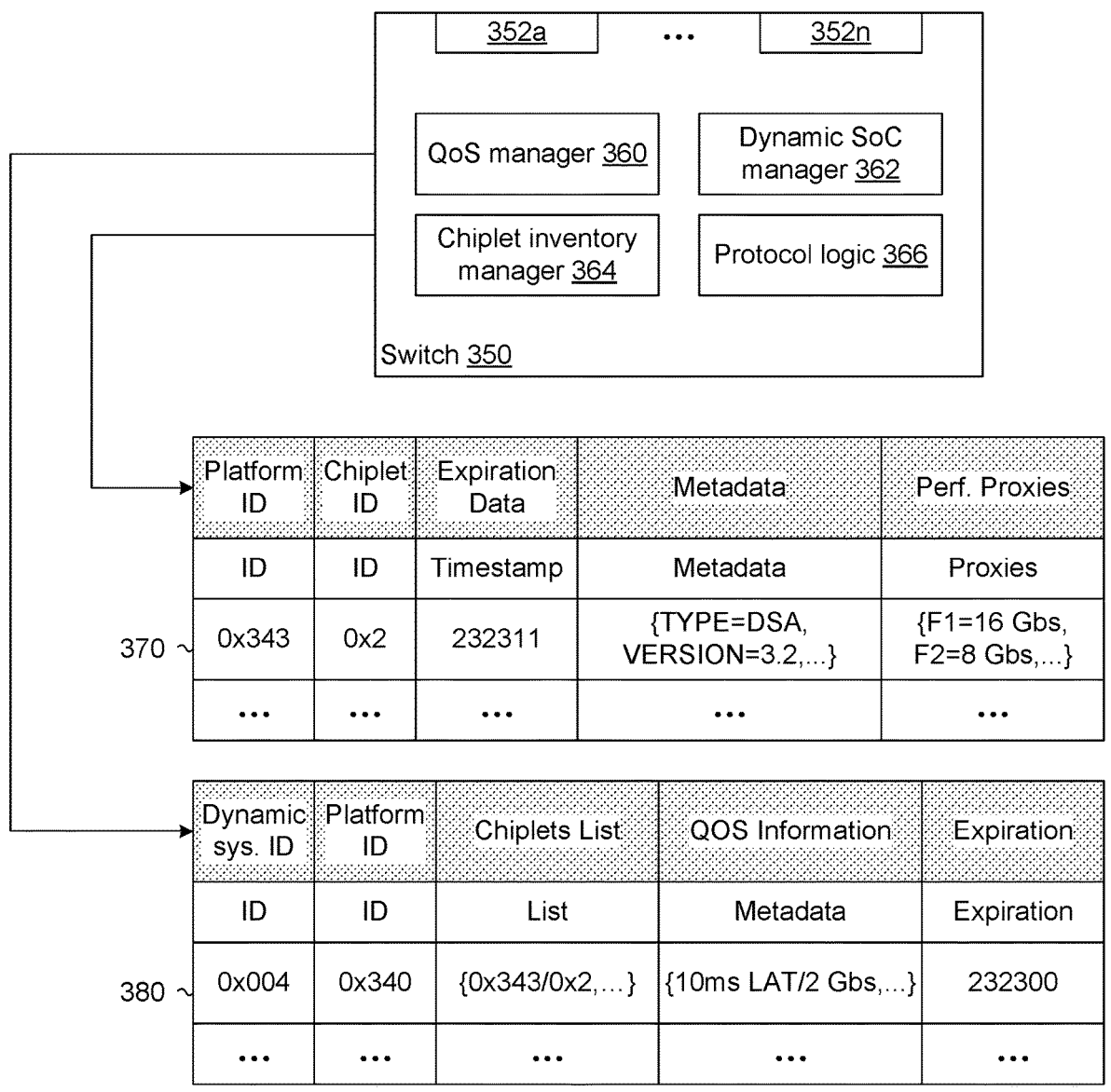
FIG. 3B is a functional block diagram illustrating features of a switch which provides an IC chip with access to a chiplet resource according to an embodiment.

FIG. 3B shows a switch 350 which provides an IC chip with access to a chiplet resource according to an embodiment. Switch 350 illustrates one example of an embodiment which supports communications via a link that is compatible with a CXL link standard, wherein, based on said communications, a resource is allocated at a chiplet (or sub-chiplet) level of granularity. In some embodiments, such allocation is exclusive to only one chip of multiple chips (not shown) which are to be coupled to switch 350—e.g., wherein the other of the multiple chips are prevented from accessing the chiplet resource during such allocation. In an embodiment, switch 350 provides functionality such as that of switch 110—e.g., wherein switch 350 performs operations of method 250.

As shown in FIG. 3B, switch 350 comprises hardware interfaces 352a, . . . , 352na, . . . , 352n which are each to couple switch 350 to a different respective one of multiple chips including at least one composite chip. This at least one composite chip includes functionality of one of XPUs 120, 150, 160, or functionality of processor 300, for example. In an embodiment, switch 350 further comprises protocol logic 366 including a controller or other suitable circuitry which supports communications—each via a respective one of hardware interface 352a, . . . , 352n—which are variously according to a CXL.chiplet protocol as described herein. For example, protocol logic 366 supports communications to receive capability information, to advertise some or all of an inventory of available chiplet resource functionalities, to detect a request for an allocation of a chiplet resource, and/or to provide such allocation to a requestor chip. In some embodiments, protocol logic 366 further supports communications according to one or more conventional CXL protocols such as a CXL.mem protocol, a CXL.io protocol or a CXL.cache protocol.

In one such embodiment, switch 350 further comprises a chiplet inventory manager 364 which is to receive, snoop or otherwise identify capability information which is received in communications by protocol logic 366. Based on the capability information, chiplet inventory manager 364 generates an inventory of functionalities which are each provided by a resource of a respective chiplet that is coupled to switch 350. By way of illustration and not limitation, table 370 illustrates an inventory which chiplet inventory manager 364 generates based on capability information received via hardware interfaces 352a, . . . , 352na, . . . , 352n. In the example embodiment shown, a first entry of table 370 corresponds to particular resource of a chiplet, wherein the first entry comprises an identifier—such as the illustrative hexadecimal value 0x343 shown—of a platform (e.g., a composite chip) which includes the chiplet. Furthermore, the first entry comprises an identifier (0x2) of a chiplet of the platform, and metadata which describes a functionality that is provided by a resource of the identified chiplet. In the example embodiment shown, the metadata indicates that the identified chiplet supports a data streaming accelerator functionality which is compatible (for example) with a particular version of the DSA technology from Intel Corporation of Santa Clara, CA. It is to be noted that, in various embodiments, the CXL.chiplet protocol efficiently accommodates extension to identify additional or alternative types of chiplet resource functionality—e.g., by extending or otherwise adapting the types of functionalities which can be identified with the metadata parameter in table 370. In some embodiments, the first entry further includes an identifier of one or more performance metrics (or "proxies")—such as available data rates—which can be supported by the identified chiplet. In one such embodiment, processor 300 further comprises a quality of service (QoS) manager 360 which enforces some or all of the performance metrics which are required. The inventory represented by table 370 includes more and/or different entries, in other embodiments.

Processor 300 further comprises a dynamic SoC manager 362 which includes circuitry to dynamically allocate a chiplet resource to a given chip which is coupled to processor 300 via one of hardware interfaces 352a, . . . , 352na, . . . , 352n. In an embodiment, dynamic SoC manager 362 receive an indication from protocol logic 366 that the given chip has requested to have access to a particular functionality. Based on the indication, dynamic SoC manager 362, chiplet inventory manager 364, and/or other suitable logic of switch 350, searches table 370 to find an entry which includes an identifier of the requested functionality. Based on the search, dynamic SoC manager 362 generates, updates or otherwise accesses reference information which is to identify that a dynamically generated system comprises one or more cores of the requestor chip, and further comprises a chiplet resource which provides the requested functionality.

In the example embodiment shown, dynamic SoC manager 362 accesses a table 380 (or other suitable data structure) which includes entries that each correspond to a different system that is dynamically generated by the allocation of a respective chiplet resource. In one such embodiment, table 380 comprises a second entry which corresponds to a first system which is dynamically generated, at least in part, by the allocation of the chiplet resource described in the first entry of table 370. In one such embodiment, the second entry comprises a field which includes an identifier (such as the illustrative hexadecimal value 0x004) which is to be used as a label for the first system. Furthermore, the second entry comprises a field which identifies a platform—e.g., a composite (or other) IC chip—that comprises one or more processor cores which are to be a host of the first system. Further still, the second entry comprises a field which lists the chiplet resources which are currently allocated to the first system. Further still, the second entry comprises a field which provides metadata that describes a functionality, a performance metric and/or other characteristics of the allocated chiplet resource(s). In some embodiments, the second entry further comprises a field which specifies or otherwise indicates the duration of a period of time before the allocation of the chiplet resource(s) is to expire.

FIG. 4A-4C shows tables 400, 410, 420 (respectively) which illustrate examples of respective information which is communicated each to facilitate an allocation of a chiplet resource via a switch according to a corresponding embodiment. Tables 400, 410, 420 each represent a corresponding type of message which, for example, is communicated, according to a CXL.chiplet protocol, between switch 110 and one of XPUs 120, 150, 160 (or, for example, between processor 300 and switch 350)—e.g., wherein method 200 and/or method 250 includes or is otherwise based on some or all such communications.

For example, table 400 illustrates information which is communicated—e.g., from a processor core of a "requestor" IC chip to a CXL switch—in a message to request an allocation of a functionality from an available chiplet resource (if any). As shown in FIG. 4A, table 400 comprises a field (Resource.category) which is to provide an identifier of a functionality being requested—e.g., including one of a memory functionality, an accelerator functionality, a storage functionality, or the like. In various embodiments, table 400 further comprises a field (Resource.time_requested) which is to provide an identifier of a requested (e.g., minimum) length of time that the resource allocation is needed. In one such embodiment, table 400 further comprises a field (Resource_sla_req) which is to provide an indication of a performance requirement—e.g., a minimum required level of performance according to some service level agreement—that the chiplet resource will be need to support while the functionality is allocated. Furthermore, table 400 comprises a field (Resource.requestor_node_id) which is to provide an identifier of a requestor of the chiplet resource—e.g., an identifier of a host chip, chiplet, processor core or other such circuitry which is (for example) functions as a node in a non-uniform memory access architecture.

Furthermore, table 410 illustrates information which is communicated—e.g., from a CXL switch to a processor core of a requestor chip—in a message to allocate a chiplet resource to the requestor chip based on a request such as that illustrated by table 400. As shown in FIG. 4B, table 410 comprises a field (Resource.category) which is to provide an identifier of a functionality being allocated. In various embodiments, table 410 optionally further comprises a field (Resource.time_allocated) which is to provide an identifier of a requested (e.g., maximum) length of time that the resource allocation is being provided. In one such embodiment, table 410 further comprises a field (Resource_sla_available) which is to provide an identifier of a performance requirement that will be supported by the allocated chiplet resource. Furthermore, table 410 comprises a field (Resource.assignee_node_id) which is to provide an identifier of an assignee which is to be allocated the chiplet resource—e.g., an identifier of the requestor node which provided a message such as that illustrated by table 400.

Further still, table 420 illustrates information which is communicated—e.g., from a CXL switch to a processor core of a targeted chip—in a message confiture a targeted chip so that it supports access to a local chiplet resource by a remote requestor chip via the CXL switch. As shown in FIG. 4C, table 420 comprises a field (Resource.category) which is to provide an identifier of a functionality of the chiplet resource being allocated. In various embodiments, table 420 further comprises a field (Resource.time_required) which is to provide an identifier of a requested (e.g., minimum) length of time that the resource allocation is needed. In one such embodiment, table 420 further comprises a field (Resource-_sla_required) which is to provide an identifier of a performance requirement that will need to be supported by the allocated chiplet resource. Furthermore, table 420 comprises a field (Resource.requestor_node_id) which is to provide an identifier of the requestor of the chiplet resource.

Figure 5:
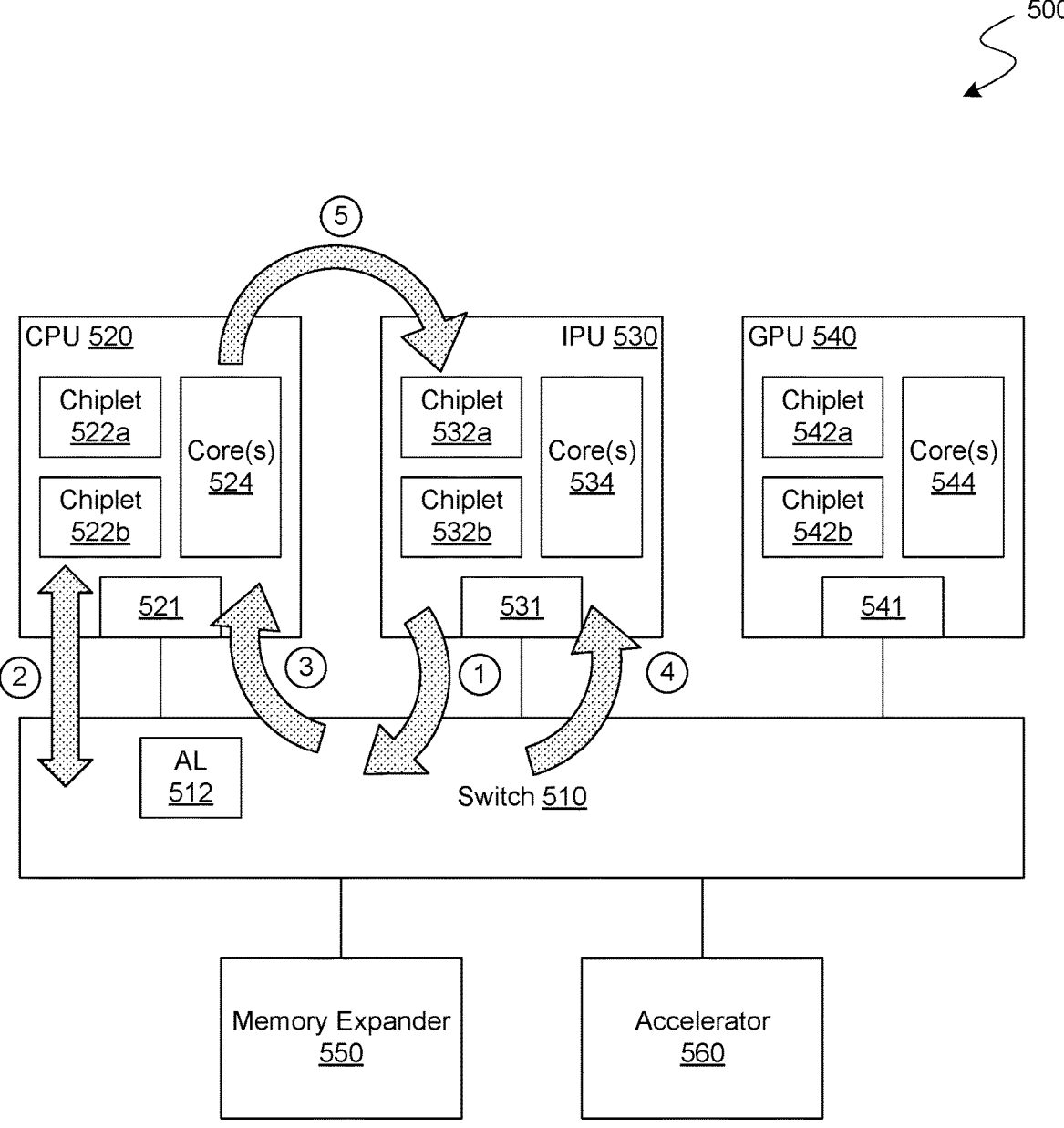
FIG. 5 is a functional block diagram illustrating communications by a system to provide access to a chiplet resource via a CXL switch according to an embodiment.

FIG. 5 shows a system 500 which performs communications to provide access to a chiplet resource via a CXL switch according to an embodiment. In an embodiment, system 500 comprises features of system 100—e.g., wherein method 200 and/or method 250 are performed with hardware logic and/or software logic of system 500.

As shown in FIG. 5, system 500 comprises a switch 510 and various processors coupled thereto—e.g., including a central processing unit (CPU) 520, an intelligence processing unit (IPU) 530, and a graphics processing unit (GPU) 540, which are coupled to switch 510 via respective input/output interfaces 521, 531, 541. In some embodiments, system 500 supports one or more CXL links each between switch 510 and a different respective one of CPU 520, IPU 530, and GPU 540. In one such embodiment, CPU 520, IPU 530, and GPU 540 correspond functionally to XPU 120, XPU 150 and XPU 160 (respectively)—e.g., wherein switch 510 provides functionality of switch 110. Although some embodiments are not limited in this regard, switch 510 further supports communication with one or more other components of system 500, such as the illustrative memory expander 550 and accelerator 560 shown.

In various embodiments, a first composite chip of system 500 is, or otherwise includes, CPU 520—e.g., wherein CPU 520 comprises one or more processor cores 524 and one or more chiplets (e.g., including the illustrative chiplets 522a, 522b shown) which are distinct form a chip(let) which includes one or more cores 524. Alternatively or in addition, a second composite chip of system 500 is, or otherwise includes, IPU 530—e.g., wherein IPU 530 comprises one or more processor cores 534 and one or more chiplets (e.g., including the illustrative chiplets 532a, 532b shown) which are distinct form a chip(let) which includes one or more cores 534. Alternatively or in addition, a third composite chip of system 500 is, or otherwise includes, GPU 540—e.g., wherein GPU 540 comprises one or more processor cores 544 and one or more chiplets (e.g., including the illustrative chiplets 542a, 542b shown) which are distinct form a chip(let) which includes one or more cores 544.

In one such embodiment, switch 510 includes allocation logic (AL) 512 which supports the allocation of a chiplet resource to one of CPU 520, IPU 530, or GPU 540—e.g., wherein AL 512 corresponds functionally to allocation logic 112, and wherein interfaces 521, 531, 541 each provide functionality such as that of one of AL 124, AL 154, or AL 164.

In an illustrative scenario according to one embodiment, switch 510 receives a message (1) whereby IPU 530 requests that AL 512 provide some or all of one or more cores 534 with access to a particular functionality. For example, message (1) includes information such as that shown in table 400, in some embodiments. Furthermore, CPU 520 and switch 510 participate in communications (2) whereby AL 512 receives capability information that identifies both chiplet 522a (for example), and a functionality which a resource of the identified chiplet 522a is able to provide. In one such embodiment, the functionality is the same which is requested by message (1) from IPU 530. Based on the capability information, AL 512 generates or updates an inventory (not shown) of currently available chiplet resources—e.g., wherein the inventory identifies, for each of the inventoried resources, a corresponding chiplet which includes the resource, and a functionality which that resource is able to support.

Based on the message (1), AL 512 searches or otherwise accesses the inventory to determine whether any inventoried chiplet resource is to be both available for allocation, and able to provide the functionality which is requested by message (1). In one such embodiment, the inventory search results in AL 512 making a determination that a resource of chiplet 522a is to be allocated for accessibility by some or all of the one or more cores 534.

Based on such a determination, AL 512 sends to interface 521 a message (3) which is to facilitate the allocation by providing a first configuration of a protocol stack (and/or other suitable logic) of IPU 530. For example, message (3) includes information such as that shown in table 420, in some embodiments. Based on the first configuration, at least some communications from the allocated resource of chiplet 522a are routed to one or more cores 534 via switch 510 (and, for example, are prevented from being accessible by the one or more cores 524). Alternatively or in addition, based on the first configuration, at least some communications, which interface 521 receives from one or more cores 534 via switch 510, are routed to the allocated resource of chiplet 522a (e.g., rather than being routed to one or more cores 524). Alternatively or in addition, based on the first configuration, communications from one or more cores 524 which target the allocated resource of chiplet 522a are not relayed to chiplet 522a, but instead cause an interrupt, a software error message, and/or the like.

Based on such a determination, AL 512 also sends to interface 531 a message (4) which is further to facilitate the allocation by providing a second configuration of a protocol stack (and/or other suitable logic) of IPU 530. For example, message (4) includes information such as that shown in table 410, in some embodiments. Based on the second configuration, at least some communications, which interface 531 receives from the allocated resource of chiplet 522a via switch 510, are routed to a given one of the core(s) 534. Alternatively or in addition, based on the second configuration, communications from one or more cores 534 which target the allocated resource of chiplet 522a are relayed to switch 510 for transmission to CPU 520.

Based on the first configuration and the second configuration, one or more cores 534 and the allocated resource of chiplet 522a participate in one or more communications with each other via switch 510—e.g., wherein such communications include the illustrative message (5) shown. Subsequently, interface 521 and/or interface 531 are variously reconfigured by AL 512 to facilitate a deallocation of the resource of chiplet 522a from core(s) 534. For example, such deallocation takes place after the completion of a particular workload, the expiration of a predetermined length of time, and/or the like.

FIG. 6 shows a system 600 which facilitates access to a chiplet resource via a CXL switch according to another embodiment. In an embodiment, system 600 comprises features of one of systems 100, 500—e.g., wherein method 200 and/or method 250 are performed with hardware logic and/or software logic of system 600.

As shown in FIG. 6, system 600 comprises a switch 610, a central processing unit (CPU) 620, an intelligence processing unit (IPU) 630, and a graphics processing unit (GPU) 640, which (for example) correspond functionally to switch 510, CPU 520, IPU 530, and GPU 540. Switch 510 is coupled to CPU 520, IPU 530, and GPU 540 via respective input/output interfaces 521, 531, 541 thereof. Although some embodiments are not limited in this regard, switch 610 (in addition to supporting inter-processor communications) supports communication with one or more other components of system 600, such as the illustrative memory expander 650 and accelerator 660 shown.

In various embodiments, a first composite chip of system 600 is, or otherwise includes, CPU 620—e.g., wherein CPU 620 comprises one or more processor cores 624 and one or more chiplets such as the chiplets 622a, 622b shown. Alternatively or in addition, a second composite chip of system 600 is, or otherwise includes, IPU 630—e.g., wherein IPU 630 comprises one or more processor cores 634 and one or more chiplets such as the chiplets 632a, 632b shown. Alternatively or in addition, a third composite chip of system 600 is, or otherwise includes, GPU 640—e.g., wherein GPU 640 comprises one or more processor cores 644 and one or more chiplets such as the chiplets 642a, 642b shown.

In one such embodiment, switch 610 includes allocation logic (AL) 612 which supports the allocation of a chiplet resource to one of CPU 620, IPU 630, or GPU 640—e.g., wherein AL 612 corresponds functionally to allocation logic 112, and wherein interfaces 621, 631, 641 each provide functionality such as that of one of AL 124, AL 154, or AL 164. In the example embodiment shown, AL 612 determines an allocation of a given chiplet resource to some or all of the processor cores of the same composite chiplet which includes that given chiplet resource.

For example, in an illustrative scenario according to one embodiment, switch 610 receives a message (1) whereby CPU 620 requests that AL 612 provide some or all of one or more cores 624 with access to a particular functionality. For example, message (1) includes information such as that shown in table 400, in some embodiments. Furthermore, CPU 620 and switch 610 participate in communications (2) whereby AL 612 receives capability information that identifies both chiplet 622a (for example), and a functionality which a resource of the identified chiplet 622a is able to provide. In one such embodiment, the functionality is the same which is requested by message (1) from CPU 620. Based on the capability information, AL 612 generates or updates an inventory (not shown) of currently available chiplet resources to indicate that the resource of chiplet 622a is available to provide the functionality.

Based on the message (1), AL 612 searches or otherwise accesses the inventory to determine whether any inventoried chiplet resource is to be both available for allocation, and able to provide the functionality which is requested by message (1). In one such embodiment, the inventory search results in AL 612 making a determination that a resource of chiplet 622a is to be allocated for accessibility by some or all of the one or more cores 624.

Based on such a determination, AL 612 sends to interface 621 a message (3) which is to facilitate the allocation by providing a configuration of a protocol stack (and/or other suitable logic) of CPU 640. For example, message (3) includes information such as that shown in table 410 and/or information such as that shown in table 420, in some embodiments. Based on the first configuration, at least some communications from the allocated resource of chiplet 622a are routed to one or more cores 624—e.g., where such routing bypasses or otherwise does not include switch 610. Alternatively or in addition, based on the first configuration, at least some communications, at least some communications from the one or more cores 624 are routed to the allocated resource of chiplet 622*a*.

Subsequently, interface 621 is reconfigured by AL 612 to facilitate a deallocation of the resource of chiplet 622*a* from core(s) 624. For example, such deallocation takes place after the completion of a particular workload, the expiration of a predetermined length of time, and/or the like.

FIG. 7 shows a port 700 which comprising a protocol stack which is (re)configurable facilitate an allocation of chiplet resources according to an embodiment. In an embodiment, port 700 is provided with one of AL 124, AL 154, or AL 164, with connector 306, with one of interfaces 521, 531, 541, or with one of interfaces 621, 631, 641. Port 700 illustrates one embodiment which provides a protocol stack comprising a physical layer, a link layer, and a transaction layer that are compatible with a physical layer standard, a link layer standard, and a transaction layer standard (respectively) which are identified in a CXL specification. The protocol stack further supports a CXL.chiplet protocol that enables chiplet resource allocation functionality as described herein.

Port 700 illustrates an example of an embodiment which supports a protocol whereby a chiplet of a composite chip is enumerated, advertised, requested, allocated and/or used by a processor core of another chip (or, for example, by a core of the same composite chip). As shown in FIG. 7, port 700 implements a protocol stack (in this example, that of a Flex Bus architecture) which is organized as multiple layers to implement multiple communication protocols. For instance, port 700 includes transaction layer logic (e.g., 705), link layer logic (e.g., 710), and physical layer logic (e.g., 715) (e.g., implemented all or in-part with circuitry). For instance, a transaction layer (e.g., 705) is subdivided into transaction layer logic 725 that implements a PCIe transaction layer 755, as well as CXL.io transaction layer 760 enhancements to the base PCIe transaction layer 755. The translation layer 705 further includes logic 730 to implement CXL cache (e.g., CXL.cache) transaction layer functionality for a CXL link, and logic 732 to implement CXL memory (e.g., CXL.mem) transaction layer functionality for a CXL link. In an embodiment, the translation layer 705 further includes logic 734 to implement transaction layer functionality for communications according to a CXL.chiplet protocol, as described herein.

In one such embodiment, the CXL link layer 710 comprises link layer logic 735 which implements a base PCIe data link layer 765 and a CXL.io link layer 770 representing an enhanced version of the PCIe data link layer 765. CXL link layer 710 also includes logic 740 to implement CXL cache (e.g., CXL.cache) link layer functionality, and logic 742 to implement CXL memory (e.g., CXL.mem) link layer functionality. In an embodiment, CXL link layer 710 further includes logic 744 to implement link layer functionality for communications according to the CXL.chiplet protocol.

Continuing with the example of FIG. 7, a CXL link layer logic 710 is coupled to interface with CXL arbitration/multiplexing (ARB/MUX) logic 720, which interleaves the traffic from two or more logical streams (e.g., including a PCIe/CXL.io stream, a CXL.cache stream, a CXL.mem and/or a CXL.chiplet stream), among other example implementations. During link training, the transaction and link layers are configured to operate in either PCIe mode or CXL mode. In some instances, a host CPU may support imple-mentation of either PCIe or CXL mode, while other devices, such as accelerators, may only support CXL mode, among other examples. In some implementations, the port (e.g., a Flex Bus port) may utilize a physical layer 715 based on a PCIe physical layer (e.g., PCIe electrical PHY 750). For instance, a Flex Bus physical layer may be implemented as a converged logical physical layer 745 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., ×16, ×8, ×4, ×2, ×1, etc.). In PCIe mode, links implemented by the port 700 may be fully compliant with native PCIe features (e.g., as defined in the PCIe specification), while in CXL mode, the link supports all features defined for CXL, and/or CXL.chiplet protocol features which are an extension of conventional CXL func-tionality. Accordingly, a Flex Bus port may provide a point-to-point interconnect that can transmit native PCIe protocol data or dynamic multi-protocol CXL data to pro-vide I/O, coherency, memory, and/or CXL.chpilet protocols, over PCIe electricals, among other examples.

The CXL I/O protocol, CXL.io, provides a non-coherent load/store interface for I/O devices. Transaction types, trans-action packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface con-sists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configu-rations (e.g., flat, hierarchical, etc.), among other example features. In some implementations, a coherency engine of the host processor may interface with memory using CXL.mem requests and responses.

Exemplary Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded proces-sors, digital signal processors (DSPs), graphics devices, video game devices, set-top boxes, micro controllers, cell phones, portable media players, hand-held devices, and various other electronic devices, are also suitable. In general, a variety of systems or electronic devices capable of incor-porating a processor and/or other execution logic as dis-closed herein are generally suitable.

Figure 8:
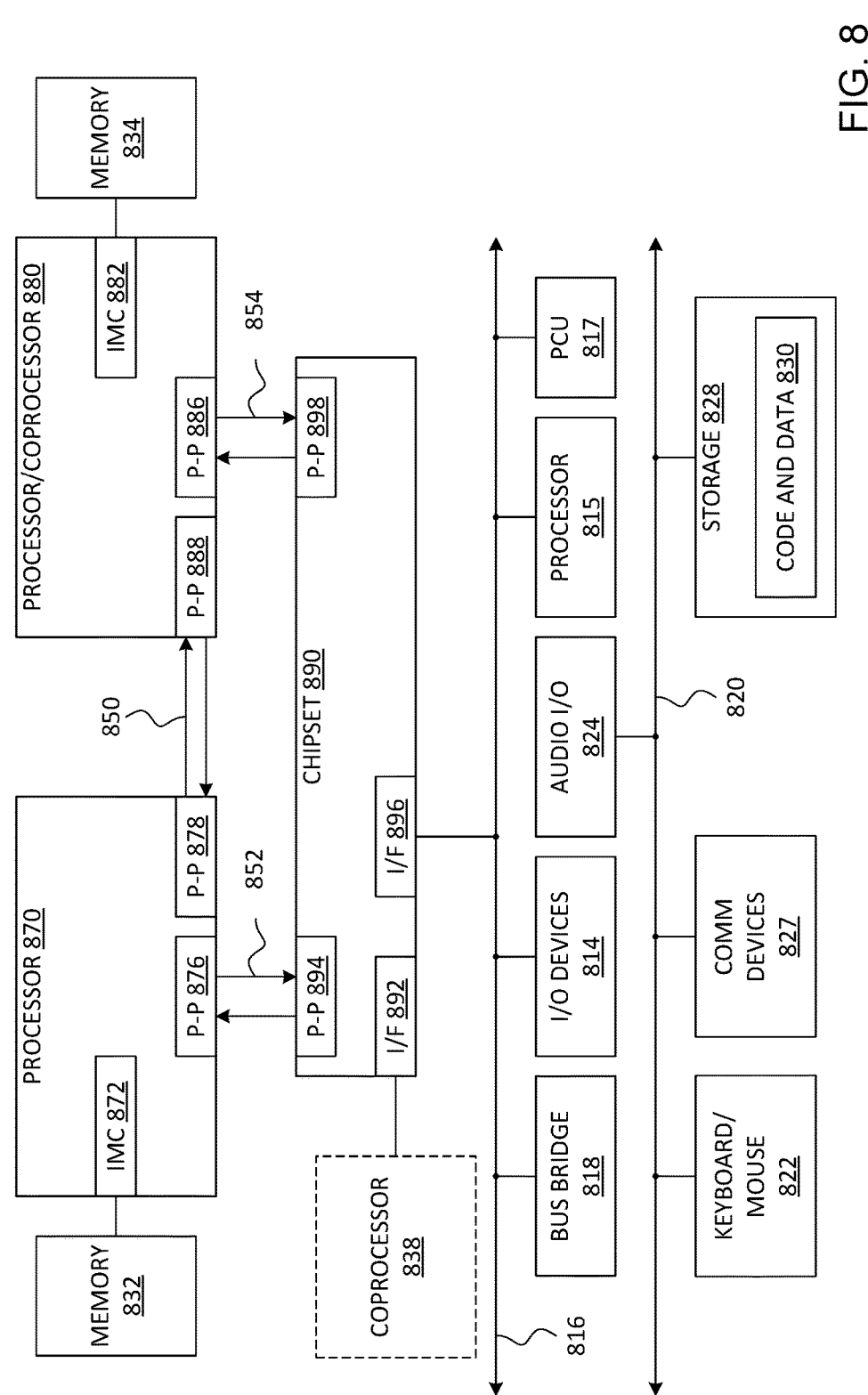
FIG. 8 illustrates an exemplary system.

FIG. 8 illustrates an exemplary system. Multiprocessor system 800 is a point-to-point interconnect system and includes a plurality of processors including a first processor 870 and a second processor 880 coupled via a point-to-point interconnect 850. In some examples, the first processor 870 and the second processor 880 are homogeneous. In some examples, first processor 870 and the second processor 880 are heterogenous. Though the exemplary system 800 is shown to have two processors, the system may have three or more processors, or may be a single processor system.

Processors 870 and 880 are shown including integrated memory controller (IMC) circuitry 872 and 882, respectively. Processor 870 also includes as part of its interconnect controller point-to-point (P-P) interfaces 876 and 878; similarly, second processor 880 includes P-P interfaces 886 and 888. Processors 870, 880 may exchange information via the point-to-point (P-P) interconnect 850 using P-P interface circuits 878, 888. IMCs 872 and 882 couple the processors 870, 880 to respective memories, namely a memory 832 and a memory 834, which may be portions of main memory locally attached to the respective processors.

Processors 870, 880 may each exchange information with a chipset 890 via individual P-P interconnects 852, 854 using point to point interface circuits 876, 894, 886, 898. Chipset 890 may optionally exchange information with a coprocessor 838 via an interface 892. In some examples, the coprocessor 838 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 870, 880 or outside of both processors, yet connected with the processors via P-P interconnect, such that either or both processors' local cache information may be stored in the shared cache if a processor is placed into a low power mode.

Chipset 890 may be coupled to a first interconnect 816 via an interface 896. In some examples, first interconnect 816 may be a Peripheral Component Interconnect (PCI) interconnect, or an interconnect such as a PCI Express interconnect or another I/O interconnect. In some examples, one of the interconnects couples to a power control unit (PCU) 817, which may include circuitry, software, and/or firmware to perform power management operations with regard to the processors 870, 880 and/or co-processor 838. PCU 817 provides control information to a voltage regulator (not shown) to cause the voltage regulator to generate the appropriate regulated voltage. PCU 817 also provides control information to control the operating voltage generated. In various examples, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other examples, power management operations to be performed by PCU 817 may be implemented externally to a processor, such as by way of a separate power management integrated circuit (PMIC) or another component external to the processor. In yet other examples, power management operations to be performed by PCU 817 may be implemented within BIOS or other system software.

Various I/O devices 814 may be coupled to first interconnect 816, along with a bus bridge 818 which couples first interconnect 816 to a second interconnect 820. In some examples, one or more additional processor(s) 815, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 816. In some examples, second interconnect 820 may be a low pin count (LPC) interconnect. Various devices may be coupled to second interconnect 820 including, for example, a keyboard and/or mouse 822, communication devices 827 and a storage circuitry 828. Storage circuitry 828 may be one or more non-transitory machine-readable storage media as described below, such as a disk drive or other mass storage device which may include instructions/code and data 830 in some examples. Further, an audio I/O 824 may be coupled to second interconnect 820. Note that other architectures than the point-to-point architecture described above are possible. For example, instead of the point-to-point architecture, a system such as multiprocessor system 800 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

FIG. 9 illustrates a block diagram of an example processor 900 that may have more than one core and an integrated memory controller. The solid lined boxes illustrate a processor 900 with a single core 902A, a system agent unit circuitry 910, a set of one or more interconnect controller unit(s) circuitry 916, while the optional addition of the dashed lined boxes illustrates an alternative processor 900 with multiple cores 902A-N, a set of one or more integrated memory controller unit(s) circuitry 914 in the system agent unit circuitry 910, and special purpose logic 908, as well as a set of one or more interconnect controller units circuitry

916. Note that the processor 900 may be one of the processors 870 or 880, or co-processor 838 or 815 of FIG. 8.

Thus, different implementations of the processor 900 may include: 1) a CPU with the special purpose logic 908 being integrated graphics and/or scientific (throughput) logic (which may include one or more cores, not shown), and the cores 902A-N being one or more general purpose cores (e.g., general purpose in-order cores, general purpose out-of-order cores, or a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 904A-N within the cores 902A-N, a set of one or more shared cache unit(s) circuitry 906, and external memory (not shown) coupled to the set of integrated memory controller unit(s) circuitry 914. The set of one or more shared cache unit(s) circuitry 906 may include one or more mid-level caches, such as level 2 (L2), level 3 (L3), level 4 (L4), or other levels of cache, such as a last level cache (LLC), and/or combinations thereof. While in some examples ring-based interconnect network circuitry 912 interconnects the special purpose logic 908 (e.g., integrated graphics logic), the set of shared cache unit(s) circuitry 906, and the system agent unit circuitry 910, alternative examples use any number of well-known techniques for interconnecting such units. In some examples, coherency is maintained between one or more of the shared cache unit(s) circuitry 906 and cores 902A-N.

In some examples, one or more of the cores 902A-N are capable of multi-threading. The system agent unit circuitry 910 includes those components coordinating and operating cores 902A-N. The system agent unit circuitry 910 may include, for example, power control unit (PCU) circuitry and/or display unit circuitry (not shown). The PCU may be or may include logic and components needed for regulating the power state of the cores 902A-N and/or the special purpose logic 908 (e.g., integrated graphics logic). The display unit circuitry is for driving one or more externally connected displays.

The cores 902A-N may be homogenous in terms of instruction set architecture (ISA). Alternatively, the cores 902A-N may be heterogeneous in terms of ISA; that is, a subset of the cores 902A-N may be capable of executing an ISA, while other cores may be capable of executing only a subset of that ISA or another ISA.

Exemplary Core Architectures—In-Order and Out-of-Order Core Block Diagram.

Figures 10A, 10B:
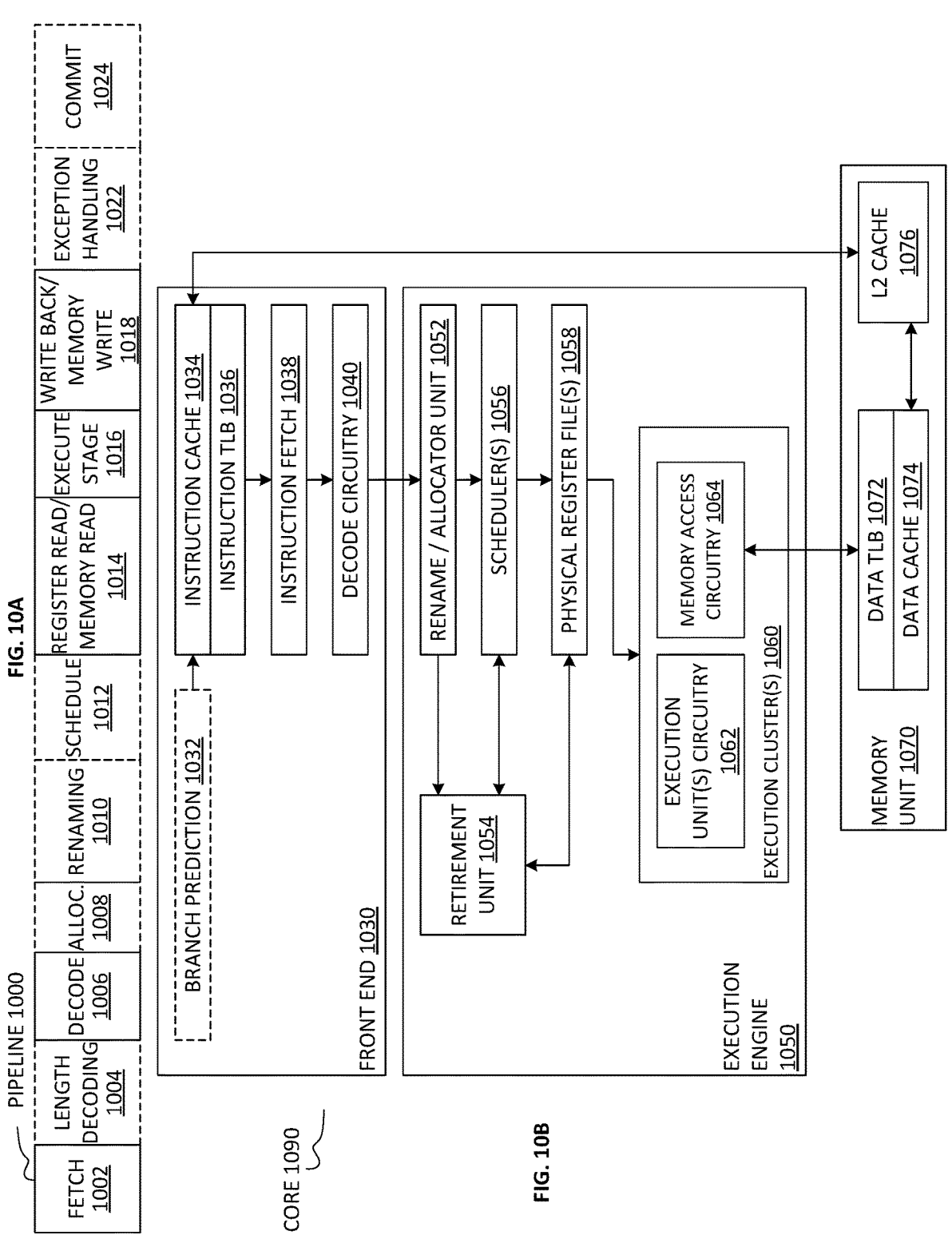
FIG. 10A is a block diagram illustrating both an exemplary in-order pipeline and an exemplary register renaming, out-of-order issue/execution pipeline according to examples.
FIG. 10B is a block diagram illustrating both an exemplary example of an in-order architecture core and an exemplary register renaming, out-of-order issue/execution architecture core to be included in a processor according to examples.

FIG. 10A is a block diagram illustrating both an exemplary in-order pipeline and an exemplary register renaming, out-of-order issue/execution pipeline according to examples. FIG. 10B is a block diagram illustrating both an exemplary example of an in-order architecture core and an exemplary register renaming, out-of-order issue/execution architecture core to be included in a processor according to examples. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, an optional length decoding stage 1004, a decode stage 1006, an optional allocation (Alloc) stage 1008, an optional renaming stage 1010, a schedule (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, and during the decode stage 1006, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1006 and the register read/memory read stage 1014 may be combined into one pipeline stage. In one example, during the execute stage 1016, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 10B may implement the pipeline 1000 as follows: 1) the instruction fetch circuitry 1038 performs the fetch and length decoding stages 1002 and 1004; 2) the decode circuitry 1040 performs the decode stage 1006; 3) the rename/allocator unit circuitry 1052 performs the allocation stage 1008 and renaming stage 1010; 4) the scheduler(s) circuitry 1056 performs the schedule stage 1012; 5) the physical register file(s) circuitry 1058 and the memory unit circuitry 1070 perform the register read/memory read stage 1014; the execution cluster(s) 1060 perform the execute stage 1016; 6) the memory unit circuitry 1070 and the physical register file(s) circuitry 1058 perform the write back/memory write stage 1018; 7) various circuitry may be involved in the exception handling stage 1022; and 8) the retirement unit circuitry 1054 and the physical register file(s) circuitry 1058 perform the commit stage 1024.

FIG. 10B shows a processor core 1090 including front-end unit circuitry 1030 coupled to an execution engine unit circuitry 1050, and both are coupled to a memory unit circuitry 1070. The core 1090 may be a reduced instruction set architecture computing (RISC) core, a complex instruction set architecture computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit circuitry 1030 may include branch prediction circuitry 1032 coupled to an instruction cache circuitry 1034, which is coupled to an instruction translation lookaside buffer (TLB) 1036, which is coupled to instruction fetch circuitry 1038, which is coupled to decode circuitry 1040. In one example, the instruction cache circuitry 1034 is included in the memory unit circuitry 1070 rather than the front-end circuitry 1030. The decode circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1040 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1040 may be implemented using various different mechanisms. Examples of suitable mechanisms include, but are not limited to, look-up tables, hardware implementations, programmable logic arrays (PLAs), microcode read only memories (ROMs), etc. In one example, the core 1090 includes a microcode ROM (not shown) or other medium that stores microcode for certain macroinstructions (e.g., in decode circuitry 1040 or otherwise within the front end circuitry 1030). In one example, the decode circuitry 1040 includes a micro-operation (micro-op) or operation cache (not shown) to hold/cache decoded operations, micro-tags, or micro-operations generated during the decode or other stages of the processor pipeline 1000. The decode circuitry 1040 may be coupled to rename/allocator unit circuitry 1052 in the execution engine circuitry 1050.

The execution engine circuitry 1050 includes the rename/allocator unit circuitry 1052 coupled to a retirement unit circuitry 1054 and a set of one or more scheduler(s) circuitry 1056. The scheduler(s) circuitry 1056 represents any number of different schedulers, including reservations stations, central instruction window, etc. In some examples, the scheduler(s) circuitry 1056 can include arithmetic logic unit (ALU) scheduler/scheduling circuitry, ALU queues, arithmetic generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1058 includes vector registers unit circuitry, writemask registers unit circuitry, and scalar register unit circuitry. These register units may provide architectural vector registers, vector mask registers, general-purpose registers, etc. The physical register file(s) circuitry 1058 is coupled to the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution unit(s) circuitry 1062 and a set of one or more memory access circuitry 1064. The execution unit(s) circuitry 1062 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1064). It should also be understood that where separate pipelines are used, one or more of these pipelines may be out-of-order issue/execution and the rest in-order.

In some examples, the execution engine unit circuitry 1050 may perform load store unit (LSU) address/data pipelining to an Advanced Microcontroller Bus (AMB) interface (not shown), and address phase and writeback, data phase load, store, and branches.

The set of memory access circuitry 1064 is coupled to the memory unit circuitry 1070, which includes data TLB circuitry 1072 coupled to a data cache circuitry 1074 coupled to a level 2 (L2) cache circuitry 1076. In one exemplary example, the memory access circuitry 1064 may include a load unit circuitry, a store address unit circuit, and a store data unit circuitry, each of which is coupled to the data TLB circuitry 1072 in the memory unit circuitry 1070. The instruction cache circuitry 1034 is further coupled to the level 2 (L2) cache circuitry 1076 in the memory unit circuitry 1070. In one example, the instruction cache 1034 and the data cache 1074 are combined into a single instruction and data cache (not shown) in L2 cache circuitry 1076, a level 3 (L3) cache circuitry (not shown), and/or main memory. The L2 cache circuitry 1076 is coupled to one or more other levels of cache and eventually to a main memory.

The core 1090 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1090 includes logic to support a packed data instruction set architecture extension (e.g., AVX1, AVX2), thereby allowing the operations used by many multimedia applications to be performed using packed data.

Exemplary Execution Unit(s) Circuitry.

Figure 11:
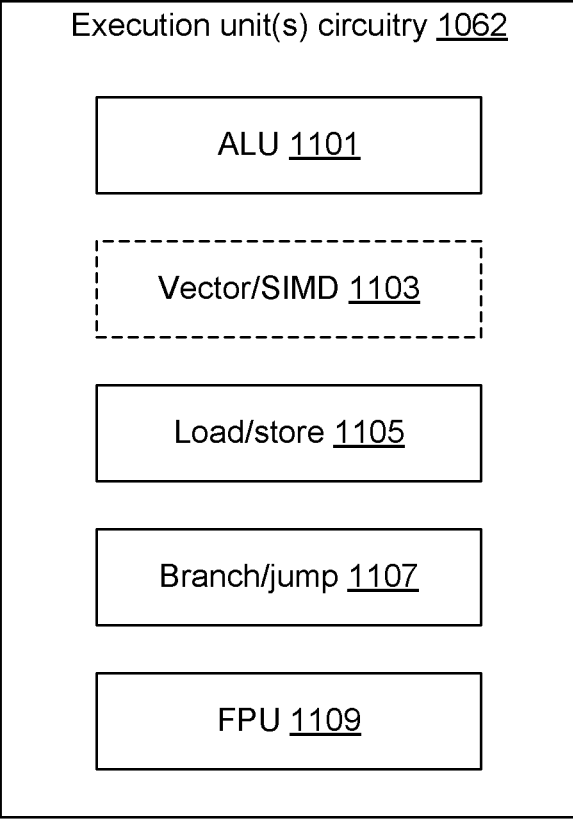
FIG. 11 illustrates examples of execution unit(s) circuitry.

FIG. 11 illustrates examples of execution unit(s) circuitry, such as execution unit(s) circuitry 1062 of FIG. 10B. As illustrated, execution unit(s) circuitry 1062 may include one or more ALU circuits 1101, optional vector/single instruction multiple data (SIMD) circuits 1103, load/store circuits 1105, branch/jump circuits 1107, and/or Floating-point unit (FPU) circuits 1109. ALU circuits 1101 perform integer arithmetic and/or Boolean operations. Vector/SIMD circuits 1103 perform vector/SIMD operations on packed data (such as SIMD/vector registers). Load/store circuits 1105 execute load and store instructions to load data from memory into registers or store from registers to memory. Load/store circuits 1105 may also generate addresses. Branch/jump circuits 1107 cause a branch or jump to a memory address depending on the instruction. FPU circuits 1109 perform floating-point arithmetic. The width of the execution unit(s) circuitry 1062 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

FIG. 12 is a block diagram of a register architecture 1200 according to some examples. As illustrated, the register architecture 1200 includes vector/SIMD registers 1210 that vary from 128-bit to 1,024 bits width. In some examples, the vector/SIMD registers 1210 are physically 512-bits and, depending upon the mapping, only some of the lower bits are used. For example, in some examples, the vector/SIMD registers 1210 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1200 includes writemask/predicate registers 1215. For example, in some examples, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1215 corresponds to a data element position of the destination. In other examples, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1200 includes scalar floating-point (FP) register 1245 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some examples, the one or more flag registers 1240 are called program status and control registers.

Segment registers 1220 contain segment points for use in accessing memory. In some examples, these registers are referenced by the names CS, DS, SS, ES, FS, and GS.

Machine specific registers (MSRs) 1235 control and report on processor performance. Most MSRs 1235 handle system-related functions and are not accessible to an application program. Machine check registers 1260 consist of control, status, and error reporting MSRs that are used to detect and report on hardware errors.

One or more instruction pointer register(s) 1230 store an instruction pointer value. Control register(s) 1255 (e.g., CR0-CR4) determine the operating mode of a processor (e.g., processor 870, 880, 838, 815, and/or 900) and the characteristics of a currently executing task. Debug registers 1250 control and allow for the monitoring of a processor or core's debugging operations.

Memory (mem) management registers 1265 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1200 may, for example, be used in physical register file(s) circuitry 1058.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Exemplary Instruction Formats.

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

FIG. 13 illustrates examples of an instruction format. As illustrated, an instruction may include multiple components including, but not limited to, one or more fields for: one or more prefixes 1301, an opcode 1303, addressing information 1305 (e.g., register identifiers, memory addressing information, etc.), a displacement value 1307, and/or an immediate value 1309. Note that some instructions utilize some or all of the fields of the format whereas others may only use the field for the opcode 1303. In some examples, the order illustrated is the order in which these fields are to be encoded, however, it should be appreciated that in other examples these fields may be encoded in a different order, combined, etc.

The prefix(es) field(s) 1301, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1303 is used to at least partially define the operation to be performed upon a decoding of the instruction. In some examples, a primary opcode encoded in the opcode field 1303 is one, two, or three bytes in length. In other examples, a primary opcode can be a different length. An additional 3-bit opcode field is sometimes encoded in another field.

Figure 14:
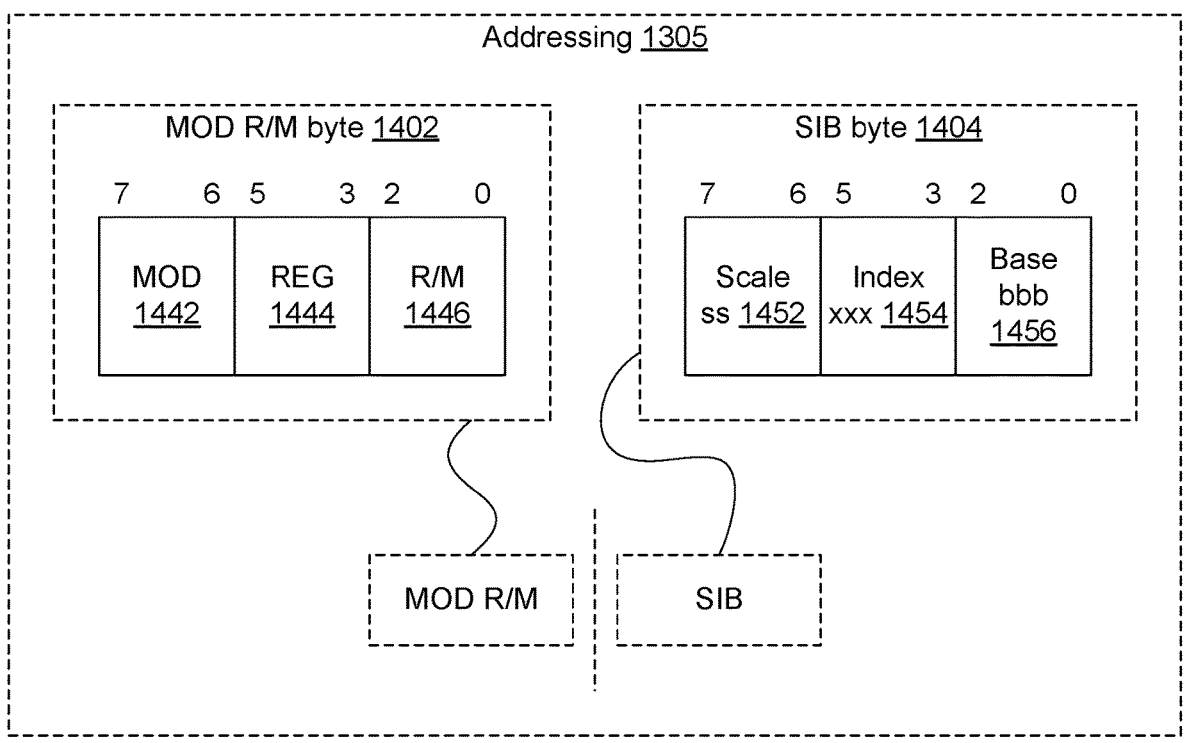
FIG. 14 illustrates examples of an addressing field.

The addressing field 1305 is used to address one or more operands of the instruction, such as a location in memory or one or more registers. FIG. 14 illustrates examples of the addressing field 1305. In this illustration, an optional ModR/M byte 1402 and an optional Scale, Index, Base (SIB) byte 1404 are shown. The ModR/M byte 1402 and the SIB byte 1404 are used to encode up to two operands of an instruction, each of which is a direct register or effective memory address. Note that each of these fields are optional in that not all instructions include one or more of these fields. The MOD R/M byte 1402 includes a MOD field 1442, a register (reg) field 1444, and R/M field 1446.

The content of the MOD field 1442 distinguishes between memory access and non-memory access modes. In some examples, when the MOD field 1442 has a binary value of 11 (11*b*), a register-direct addressing mode is utilized, and otherwise register-indirect addressing is used.

The register field 1444 may encode either the destination register operand or a source register operand, or may encode an opcode extension and not be used to encode any instruction operand. The content of register index field 1444, directly or through address generation, specifies the locations of a source or destination operand (either in a register or in memory). In some examples, the register field 1444 is supplemented with an additional bit from a prefix (e.g., prefix 1301) to allow for greater addressing.

The R/M field 1446 may be used to encode an instruction operand that references a memory address or may be used to encode either the destination register operand or a source register operand. Note the R/M field 1446 may be combined with the MOD field 1442 to dictate an addressing mode in some examples.

The SIB byte 1404 includes a scale field 1452, an index field 1454, and a base field 1456 to be used in the generation of an address. The scale field 1452 indicates scaling factor. The index field 1454 specifies an index register to use. In some examples, the index field 1454 is supplemented with an additional bit from a prefix (e.g., prefix 1301) to allow for greater addressing. The base field 1456 specifies a base register to use. In some examples, the base field 1456 is supplemented with an additional bit from a prefix (e.g., prefix 1301) to allow for greater addressing. In practice, the content of the scale field 1452 allows for the scaling of the content of the index field 1454 for memory address generation (e.g., for address generation that uses 2scale*index+base).

Some addressing forms utilize a displacement value to generate a memory address. For example, a memory address may be generated according to 2scale*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement 1307 provides this value. Additionally, in some examples, a displacement factor usage is encoded in the MOD field of the addressing field 1305 that indicates a compressed displacement scheme for which a displacement value is calculated and stored in the displacement field 1307.

In some examples, an immediate field 1309 specifies an immediate value for the instruction. An immediate value may be encoded as a 1-byte value, a 2-byte value, a 4-byte value, etc.

FIG. 15 illustrates examples of a first prefix 1301(A). In some examples, the first prefix 1301(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1301(A) may specify up to three registers using 3-bit fields depending on the format: 1) using the reg field 1444 and the R/M field 1446 of the Mod R/M byte 1402; 2) using the Mod R/M byte 1402 with the SIB byte 1404 including using the reg field 1444 and the base field 1456 and index field 1454; or 3) using the register field of an opcode.

In the first prefix 1301(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 1444 and MOD R/M R/M field 1446 alone can each only address 8 registers.

In the first prefix 1301(A), bit position 2 (R) may be an extension of the MOD R/M reg field 1444 and may be used to modify the ModR/M reg field 1444 when that field encodes a general-purpose register, a 64-bit packed data register (e.g., a SSE register), or a control or debug register. R is ignored when Mod R/M byte 1402 specifies other registers or defines an extended opcode.

Bit position 1 (X) may modify the SIB byte index field 1454.

Bit position 0 (B) may modify the base in the Mod R/M R/M field 1446 or the SIB byte base field 1456; or it may modify the opcode register field used for accessing general purpose registers (e.g., general purpose registers 1225).

FIGS. 16A-D illustrate examples of how the R, X, and B fields of the first prefix 1301(A) are used. FIG. 16A illustrates R and B from the first prefix 1301(A) being used to extend the reg field 1444 and R/M field 1446 of the MOD R/M byte 1402 when the SIB byte 1404 is not used for memory addressing. FIG. 16B illustrates R and B from the first prefix 1301(A) being used to extend the reg field 1444 and R/M field 1446 of the MOD R/M byte 1402 when the SIB byte 1404 is not used (register-register addressing). FIG. 16C illustrates R, X, and B from the first prefix 1301(A) being used to extend the reg field 1444 of the MOD R/M byte 1402 and the index field 1454 and base field 1456 when the SIB byte 1404 being used for memory addressing. FIG. 16D illustrates B from the first prefix 1301(A) being used to extend the reg field 1444 of the MOD R/M byte 1402 when a register is encoded in the opcode 1303.

Figure 17A:
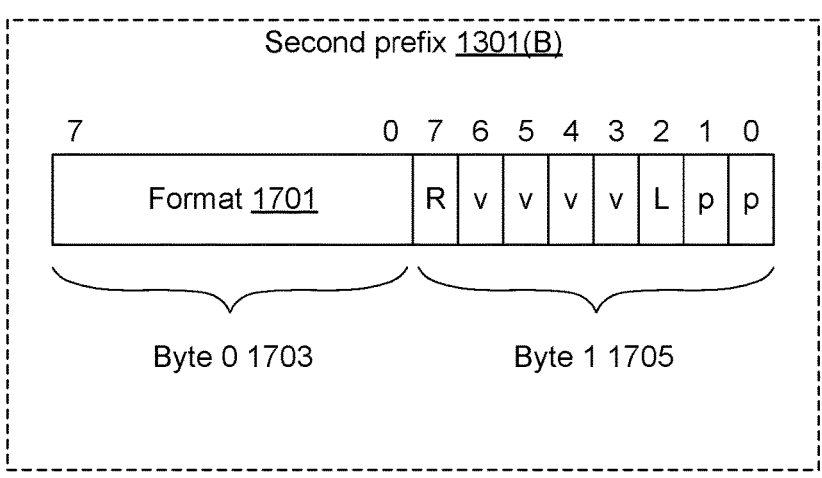
FIGS. 17A-B illustrate examples of a second prefix.
Figure 17B:
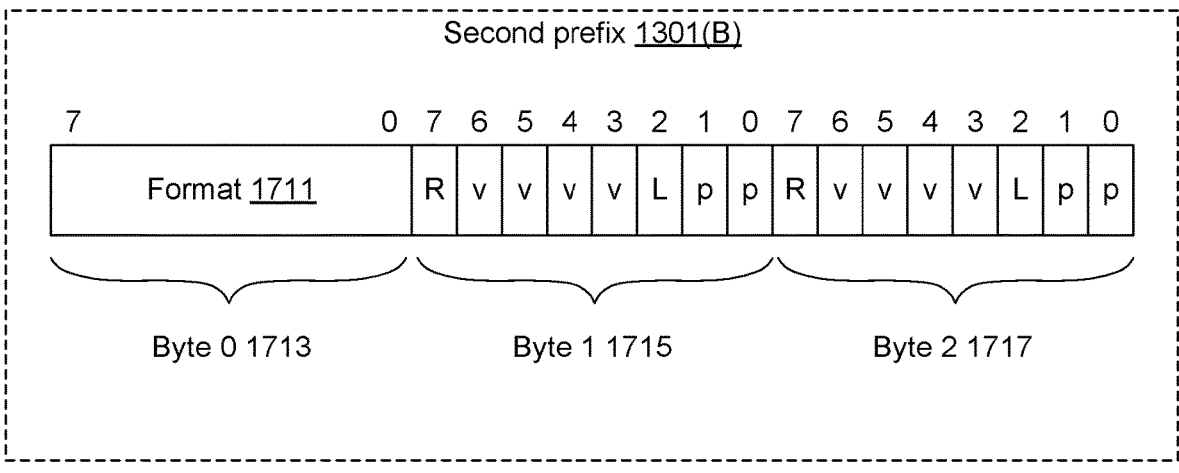

FIGS. 17A-B illustrate examples of a second prefix 1301 (B). In some examples, the second prefix 1301(B) is an example of a VEX prefix. The second prefix 1301(B) encoding allows instructions to have more than two operands, and allows SIMD vector registers (e.g., vector/SIMD registers 1210) to be longer than 64-bits (e.g., 128-bit and 256-bit). The use of the second prefix 1301(B) provides for three-operand (or more) syntax. For example, previous two-operand instructions performed operations such as A=A+B, which overwrites a source operand. The use of the second prefix 1301(B) enables operands to perform nondestructive operations such as A=B+C.

In some examples, the second prefix 1301(B) comes in two forms—a two-byte form and a three-byte form. The two-byte second prefix 1301(B) is used mainly for 128-bit, scalar, and some 256-bit instructions; while the three-byte second prefix 1301(B) provides a compact replacement of the first prefix 1301(A) and 3-byte opcode instructions.

FIG. 17A illustrates examples of a two-byte form of the second prefix 1301(B). In one example, a format field 1701 (byte 0 1703) contains the value C5H. In one example, byte 1 1705 includes a "R" value in bit[7]. This value is the complement of the "R" value of the first prefix 1301(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (is complement) form and valid for instructions with 2 or more source operands; 2) encode the destination register operand, specified in 1*s* complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446 and the Mod R/M reg field 1444 encode three of the four operands. Bits[7:4] of the immediate 1309 are then used to encode the third source register operand.

FIG. 17B illustrates examples of a three-byte form of the second prefix 1301(B). In one example, a format field 1711 (byte 0 1713) contains the value C4H. Byte 1 1715 includes in bits[7:5] "R," "X," and "B" which are the complements of the same values of the first prefix 1301(A). Bits[4:0] of byte 1 1715 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1717 is used similar to W of the first prefix 1301(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (is complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits[7:4] of the immediate 1309 are then used to encode the third source register operand.

Figure 18:
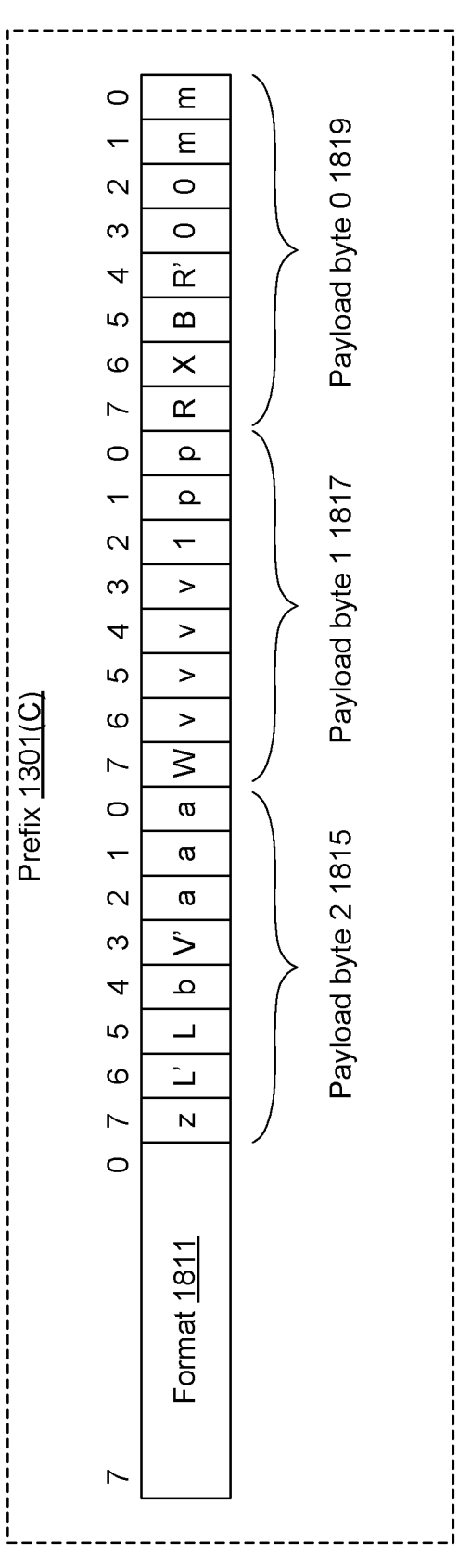
FIG. 18 illustrates examples of a third prefix.

FIG. 18 illustrates examples of a third prefix 1301(C). In some examples, the first prefix 1301(A) is an example of an EVEX prefix. The third prefix 1301(C) is a four-byte prefix.

The third prefix 1301(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 12) or predication utilize this prefix. Opmask register allow for conditional processing or selection control. Opmask instructions, whose source/destination operands are opmask registers and treat the content of an opmask register as a single value, are encoded using the second prefix 1301(B).

The third prefix 1301(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1301(C) is a format field 1811 that has a value, in one example, of 62H. Subsequent bytes are referred to as payload bytes 1815-1819 and collectively form a 24-bit value of P[23:0] providing specific capability in the form of one or more fields (detailed herein).

In some examples, P[1:0] of payload byte 1819 are identical to the low two mmmmm bits. P[3:2] are reserved in some examples. Bit P[4] (R') allows access to the high 16 vector register set when combined with P[7] and the ModR/M reg field 1444. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1444 and ModR/M R/M field 1446. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (Is complement) form and valid for instructions with 2 or more source operands; 2) encode the destination register operand, specified in is complement form for certain vector shifts; or 3) not encode any operand, the field is reserved and should contain a certain value, such as 1111b.

P[15] is similar to W of the first prefix 1301(A) and second prefix 1301(B) and may serve as an opcode extension bit or operand size promotion.

P[18:16] specify the index of a register in the opmask (writemask) registers (e.g., writemask/predicate registers 1215). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 1301(C) are detailed in the following tables.

TABLE 1

| 32-Register Support in 64-bit Mode | | | | | |
|---|---|---|---|---|---|
| | 4 | 3 | [2:0] | REG. TYPE | COMMON USAGES |
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M | GPR | Memory addressing |

TABLE 1-continued

| 32-Register Support in 64-bit Mode | | | | | |
|---|---|---|---|---|---|
| | 4 | 3 | [2:0] | REG. TYPE | COMMON USAGES |
| INDEX | 0 | X | R/M SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
| | [2:0] | REG. TYPE | COMMON USAGES |
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
| | [2:0] | REG. TYPE | COMMON USAGES |
| REG | ModR/M Reg | k0-k7 | Source |
| VVVV | vvvv | k0-k7 | 2nd Source |
| RM | ModR/M R/M | k0-k7 | 1st Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
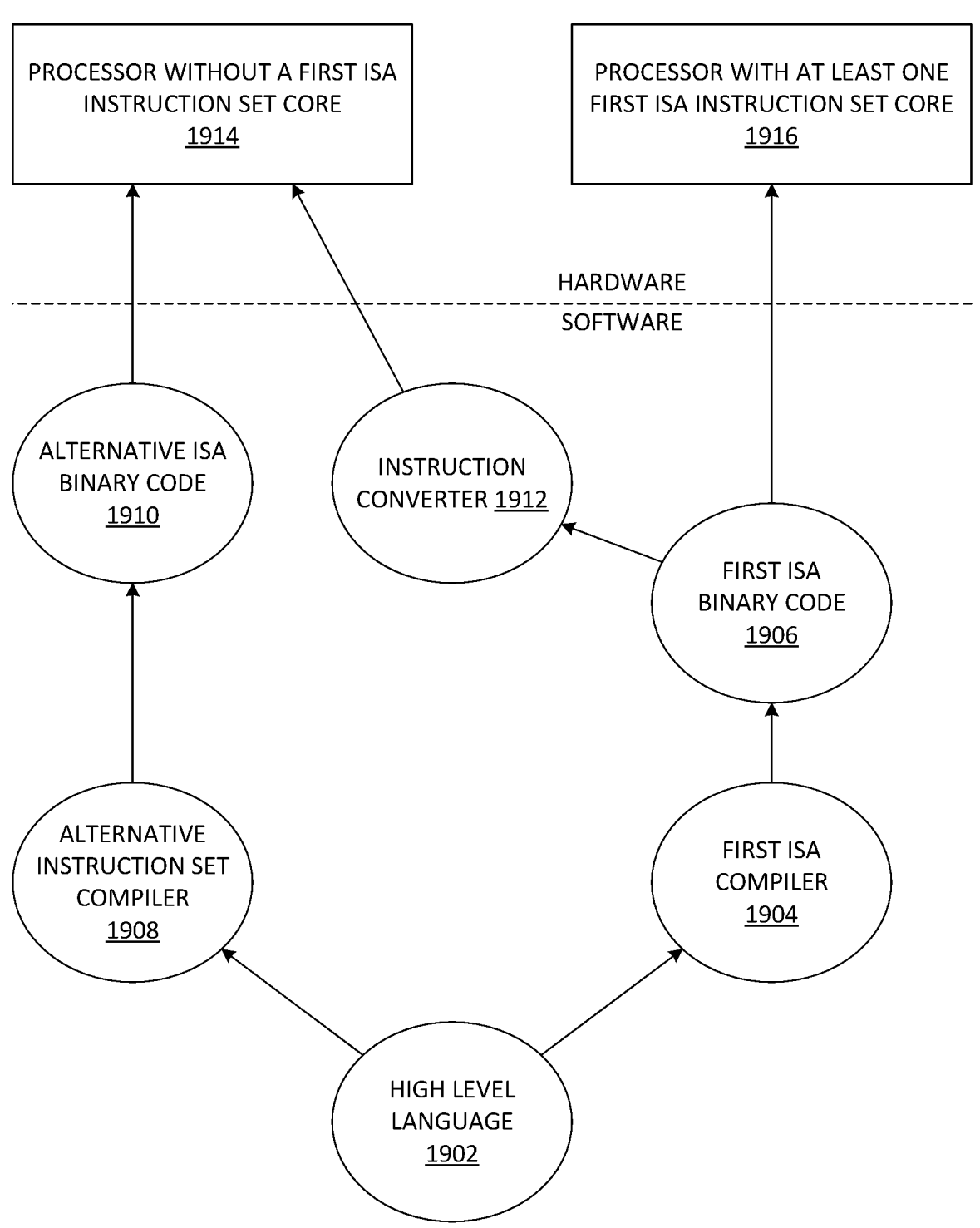
FIG. 19 is a block diagram illustrating the use of a software instruction converter to convert binary instructions in a source instruction set architecture to binary instructions in a target instruction set architecture according to examples.

FIG. 19 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 19 shows a program in a high-level language 1902 may be compiled using a first ISA compiler 1904 to generate first ISA binary code 1906 that may be natively executed by a processor with at least one first instruction set architecture core 1916. The processor with at least one first ISA instruction set architecture core 1916 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 1904 represents a compiler that is operable to generate first ISA binary code 1906 (e.g., object code) that can, with or without additional linkage processing, be executed on the processor with at least one first ISA instruction set architecture core 1916. Similarly, FIG. 19 shows the program in the high-level language 1902 may be compiled using an alternative instruction set architecture compiler 1908 to generate alternative instruction set architecture binary code 1910 that may be natively executed by a processor without a first ISA instruction set architecture core 1914. The instruction converter 1912 is used to convert the first ISA binary code 1906 into code that may be natively executed by the processor without a first ISA instruction set architecture core 1914. This converted code is not necessarily to be the same as the alternative instruction set architecture binary code 1910; however, the converted code will accomplish the general operation and be made up of instructions from the alternative instruction set architecture. Thus, the instruction converter 1912 represents software, firmware, hardware, or a combination thereof that, through emulation, simulation or any other process, allows a processor or other electronic device that does not have a first ISA instruction set architecture processor or core to execute the first ISA binary code 1906.

In one or more first embodiments, a composite chip comprises a hardware interface to couple the composite chip to a switch, a first chiplet, first circuitry coupled to the first chiplet and to the hardware interface, the first circuitry to provide to the switch capability information which comprises an identifier of the first chiplet, and an identifier of a first functionality of the first chiplet, wherein the switch provides an inventory based on the capability information, and a processor core coupled to the hardware interface, the processor core to provide, via a compute express link (CXL) link to the switch, a request to access a second functionality, wherein the switch accesses the inventory, based on the request, to identify a second chiplet of a second chip as comprising a resource which provides the second functionality, and wherein the first circuitry is further to receive from the switch an allocation of the resource to the composite chip based on the request, wherein the allocation is to configure a protocol stack of the composite chip to enable a routing of a communication to the second chiplet via the switch.

In one or more second embodiments, further to the first embodiment, the hardware interface is further to receive from the switch an advertisement of an availability of multiple chiplets, wherein the advertisement is to be based on the inventory, and wherein the request is to be based on the advertisement.

In one or more third embodiments, further to the first embodiment or the second embodiment, the processor core is further to perform a workload with the second chiplet based on the allocation, the first circuitry is further to receive a deallocation of the resource from the composite chip after a completion of the workload.

In one or more fourth embodiments, further to any of the first through third embodiments, based on the request, the switch is to disable an accessibility of the resource by one or more cores of the second chip.

In one or more fifth embodiments, further to any of the first through fourth embodiments, the resource is to be allocated to the composite chip at a chiplet level of granularity.

In one or more sixth embodiments, further to any of the first through fifth embodiments, the resource is to be allocated to the composite chip at a sub-chiplet level of granularity.

In one or more seventh embodiments, further to any of the first through sixth embodiments, the request is a first request, wherein the resource is a first resource, and wherein the allocation is a first allocation, and wherein the first circuitry is further to provide, via the CXL link to the switch, a second request to access the first functionality, wherein the switch accesses the inventory, based on the second request, to identify the first chiplet as comprising a second resource which provides the first functionality, and receive from the switch a second allocation of the second resource to the composite chip based on the second request, wherein the second allocation is to configure the protocol stack to enable an accessibility of the first chiplet by one or more processor cores of the composite chip.

In one or more eighth embodiments, further to any of the first through seventh embodiments, based on the request, the switch indicates to the composite chip an event which is to result in an end of the allocation.

In one or more ninth embodiments, further to any of the first through eighth embodiments, based on the request, the switch indicates to the composite chip a quality of service which is to be supported with the resource.

In one or more tenth embodiments, a method at a composite chip comprises providing, to a switch, capability information which comprises an identifier of a chiplet of the composite chip, and an identifier of a first functionality of the chiplet, wherein the switch provides an inventory based on the capability information, providing, via a compute express link (CXL) link to the switch, a request to access a second functionality, wherein the switch accesses the inventory, based on the request, to identify a second chiplet of a second chip as comprising a resource which provides the second functionality, and receiving from the switch an allocation of the resource to the composite chip based on the request, wherein the allocation configures a protocol stack of the composite chip to enable a routing of a communication to the second chiplet via the switch.

In one or more eleventh embodiments, further to the tenth embodiment, the method further comprises receiving from the switch an advertisement of an availability of multiple chiplets, wherein the advertisement is based on the inventory, and wherein the request is based on the advertisement.

In one or more twelfth embodiments, further to the tenth embodiment or the eleventh embodiment, the method further comprises performing a workload with the second chiplet based on the allocation, after a completion of the workload, receiving a deallocation of the resource from the composite chip.

In one or more thirteenth embodiments, further to any of the tenth through twelfth embodiments, based on the request, the switch disables an accessibility of the resource by one or more cores of the second chip.

In one or more fourteenth embodiments, further to any of the tenth through thirteenth embodiments, the resource is allocated to the composite chip at a chiplet level of granularity.

In one or more fifteenth embodiments, further to any of the tenth through fourteenth embodiments, the resource is allocated to the composite chip at a sub-chiplet level of granularity.

In one or more sixteenth embodiments, further to any of the tenth through fifteenth embodiments, the request is a first request, wherein the resource is a first resource, and wherein the allocation is a first allocation, the method further comprising providing, via the CXL link to the switch, a second request to access the first functionality, wherein the switch accesses the inventory, based on the second request, to identify the first chiplet as comprising a second resource which provides the first functionality, and receiving from the switch a second allocation of the second resource to the composite chip based on the second request, wherein the second allocation configures the protocol stack to enable an accessibility of the first chiplet by one or more processor cores of the composite chip.

In one or more seventeenth embodiments, further to any of the tenth through sixteenth embodiments, based on the request, the switch indicates to the composite chip an event which is to result in an end of the allocation.

In one or more eighteenth embodiments, further to any of the tenth through seventeenth embodiments, based on the request, the switch indicates to the composite chip a quality of service which is to be supported with the resource.

In one or more nineteenth embodiments, a system comprises a first composite chip to output first capability information comprising an identifier of a first chiplet, and an identifier of a first functionality of the first chiplet, a second composite chip to output second capability information comprising an identifier of a second chiplet, and an identifier of a second functionality of the second chiplet, a switch coupled to receive the first capability information and the second capability information, and a request from the first composite chip to access the second functionality, wherein the request is to be received via a compute express link (CXL) link, wherein the switch comprises first circuitry to generate an inventory of chiplets based on the first capability information and the second capability information, second circuitry to access the inventory, based on the request, to identify the second chiplet as comprising a resource which provides the second functionality, and third circuitry to provide to the first composite chip an allocation of the resource based on the request, wherein the allocation is to configure a protocol stack of the first composite chip to enable a routing of a communication to the second chiplet.

In one or more twentieth embodiments, further to the nineteenth embodiment, the switch further comprises fourth circuitry which, based on the inventory, is to communicate to the first composite chip an advertisement of an availability of the multiple chiplets, wherein the request is based on the advertisement.

In one or more twenty-first embodiments, further to the nineteenth embodiment or the twentieth embodiment, the switch further comprises fourth circuitry to communicate a signal between the first composite chip and the second composite chip based on the allocation, wherein the third circuitry is further to deallocate the second chiplet from the first composite chip after a completion of a workload.

In one or more twenty-second embodiments, further to any of the nineteenth through twenty-first embodiments, based on the request, the switch is to disable an accessibility of the resource by one or more cores of the second composite chip.

In one or more twenty-third embodiments, further to any of the nineteenth through twenty-second embodiments, the resource is to be allocated to the first composite chip at a chiplet level of granularity.

In one or more twenty-fourth embodiments, further to any of the nineteenth through twenty-third embodiments, the resource is to be allocated to the first composite chip at a sub-chiplet level of granularity.

In one or more twenty-fifth embodiments, further to any of the nineteenth through twenty-fourth embodiments, the request is a first request, wherein the resource is a first resource, and wherein the allocation is a first allocation, wherein the switch is further to receive, via the CXL link, a second request to access the first functionality, the second circuitry is further to access the inventory, based on the second request, to identify the first chiplet as comprising a second resource which provides the first functionality, and the third circuitry is further to provide to the first composite chip a second allocation of the second resource based on the second request, wherein the second allocation is to configure the protocol stack to enable an accessibility of the first chiplet by one or more processor cores of the first composite chip.

In one or more twenty-sixth embodiments, further to any of the nineteenth through twenty-fifth embodiments, based on the request, the switch is to indicate to the composite chip an event which is to result in an end of the allocation.

In one or more twenty-seventh embodiments, further to any of the nineteenth through twenty-sixth embodiments, based on the request, the switch is to indicate to the composite chip a quality of service which is to be supported with the resource.

In one or more twenty-eighth embodiments, a switch comprises a first hardware interface to receive first capability information which comprises an identifier of a first chiplet of a first composite chip, and an identifier of a first functionality of the first chiplet, a second hardware interface to receive second capability information which comprises an identifier of a second chiplet of a second composite chip, and an identifier of a second functionality of the second chiplet, wherein the first hardware interface is further to receive, via a compute express link (CXL) link, a request to access the second functionality, first circuitry coupled to the first hardware interface and the second hardware interface, the first circuitry to generate an inventory of chiplets based on the first capability information and the second capability information, second circuitry to access the inventory, based on the request, to identify the second chiplet as comprising a resource which provides the second functionality, and third circuitry to provide to the first composite chip an allocation of the resource based on the request, wherein the allocation is to configure a protocol stack of the first composite chip to enable a routing of a communication to the second chiplet via the switch.

In one or more twenty-ninth embodiments, further to the twenty-eighth embodiment, the switch further comprises fourth circuitry which, based on the inventory, is to communicate to the first composite chip an advertisement of an availability of the multiple chiplets, wherein the request is based on the advertisement.

In one or more thirtieth embodiments, further to the twenty-eighth embodiment or the twenty-ninth embodiment, the switch further comprises fourth circuitry to communicate a signal between the first composite chip and the second composite chip based on the allocation, wherein the third circuitry is further to deallocate the second chiplet from the first composite chip after a completion of a workload.

In one or more thirty-first embodiments, further to any of the twenty-eighth through thirtieth embodiments, based on the request, the switch is to disable an accessibility of the resource by one or more cores of the second composite chip.

In one or more thirty-second embodiments, further to any of the twenty-eighth through thirty-first embodiments, the resource is to be allocated to the first composite chip at a chiplet level of granularity.

In one or more thirty-third embodiments, further to any of the twenty-eighth through thirty-second embodiments, the resource is to be allocated to the first composite chip at a sub-chiplet level of granularity.

In one or more thirty-fourth embodiments, further to any of the twenty-eighth through thirty-third embodiments, the request is a first request, wherein the resource is a first resource, and wherein the allocation is a first allocation, wherein the first hardware interface is further to receive, via the CXL link, a second request to access the first functionality, the second circuitry is further to access the inventory, based on the second request, to identify the first chiplet as comprising a second resource which provides the first functionality, and the third circuitry is further to provide to the first composite chip a second allocation of the second resource based on the second request, wherein the second allocation is to configure the protocol stack to enable an accessibility of the first chiplet by one or more processor cores of the first composite chip.

In one or more thirty-fifth embodiments, further to any of the twenty-eighth through thirty-fourth embodiments, based on the request, the switch is to indicate to the composite chip an event which is to result in an end of the allocation.

In one or more thirty-sixth embodiments, further to any of the twenty-eighth through thirty-fifth embodiments, based on the request, the switch is to indicate to the composite chip a quality of service which is to be supported with the resource.

In one or more thirty-seventh embodiments, a method at a switch comprises receiving, from a first composite chip, first capability information which comprises an identifier of a first chiplet of the first composite chip, and an identifier of a first functionality of the first chiplet, receiving, from a second composite chip, second capability information which comprises an identifier of a second chiplet of the second composite chip, and an identifier of a second functionality of the second chiplet, based on the first capability information and the second capability information, generating an inventory of chiplets, receiving, via a compute express link (CXL) link to the first composite chip, a request to access the second functionality, based on the request, accessing the inventory to identify the second chiplet as comprising a resource which provides the second functionality, and providing to the first composite chip an allocation of the resource based on the request, wherein the allocation configures a protocol stack of the first composite chip to enable a routing of a communication to the second chiplet via the switch.

In one or more thirty-eighth embodiments, further to the thirty-seventh embodiment, the method further comprises based on the inventory, communicating to the first composite chip an advertisement of an availability of the multiple chiplets, wherein the request is based on the advertisement.

In one or more thirty-ninth embodiments, further to the thirty-seventh embodiment or the thirty-eighth embodiment, the method further comprises communicating a signal between the first composite chip and the second composite chip based on the allocation, and after a completion of a workload, deallocating the second chiplet from the first composite chip.

In one or more fortieth embodiments, further to any of the thirty-seventh through thirty-ninth embodiments, based on the request, the switch disables an accessibility of the resource by one or more cores of the second composite chip.

In one or more forty-first embodiments, further to any of the thirty-seventh through fortieth embodiments, the resource is allocated to the first composite chip at a chiplet level of granularity.

In one or more forty-second embodiments, further to any of the thirty-seventh through forty-first embodiments, the resource is allocated to the first composite chip at a sub-chiplet level of granularity.

In one or more forty-third embodiments, further to any of the thirty-seventh through forty-second embodiments, the request is a first request, wherein the resource is a first resource, and wherein the allocation is a first allocation, the method further comprising receiving, via the CXL link to the first composite chip, a second request to access the first functionality, based on the request, accessing the inventory to identify the first chiplet as comprising a second resource which provides the first functionality, and providing to the first composite chip a second allocation of the second resource based on the second request, wherein the second allocation configures the protocol stack to enable an accessibility of the first chiplet by one or more processor cores of the first composite chip.

In one or more forty-fourth embodiments, further to any of the thirty-seventh through forty-third embodiments, based on the request, the switch indicates to the composite chip an event which is to result in an end of the allocation.

In one or more forty-fifth embodiments, further to any of the thirty-seventh through forty-fourth embodiments, based on the request, the switch indicates to the composite chip a quality of service which is to be supported with the resource.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A composite chip comprising:
a hardware interface to couple the composite chip to a switch;
a first chiplet;
first circuitry coupled to the first chiplet and to the hardware interface, the first circuitry to provide to the switch capability information which comprises an identifier of the first chiplet, and an identifier of a first functionality of the first chiplet, wherein the switch provides an inventory based on the capability information; and
a processor core coupled to the hardware interface, the processor core to provide, via a compute express link (CXL) link to the switch, a request to access a second functionality, wherein the switch accesses the inventory, based on the request, to identify a second chiplet of a second chip as comprising a resource which provides the second functionality; and
wherein the first circuitry is further to receive from the switch an allocation of the resource to the composite chip based on the request, wherein the allocation is to configure a protocol stack of the composite chip to enable a routing of a communication to the second chiplet via the switch.

2. The composite chip of claim 1, wherein the hardware interface is further to receive from the switch an advertisement of an availability of multiple chiplets, wherein the advertisement is to be based on the inventory, and wherein the request is to be based on the advertisement.

3. The composite chip of claim 1, wherein:
the processor core is further to perform a workload with the second chiplet based on the allocation;
the first circuitry is further to receive a deallocation of the resource from the composite chip after a completion of the workload.

4. The composite chip of claim 1, wherein, based on the request, the switch is to disable an accessibility of the resource by one or more cores of the second chip.

5. The composite chip of claim 1, wherein the resource is to be allocated to the composite chip at a chiplet level of granularity.

6. The composite chip of claim 1, wherein the resource is to be allocated to the composite chip at a sub-chiplet level of granularity.

7. The composite chip of claim 1, wherein the request is a first request, wherein the resource is a first resource, and wherein the allocation is a first allocation, and wherein the first circuitry is further to:
provide, via the CXL link to the switch, a second request to access the first functionality, wherein the switch accesses the inventory, based on the second request, to identify the first chiplet as comprising a second resource which provides the first functionality; and
receive from the switch a second allocation of the second resource to the composite chip based on the second request, wherein the second allocation is to configure the protocol stack to enable an accessibility of the first chiplet by one or more processor cores of the composite chip.

8. The composite chip of claim 1, wherein, based on the request, the switch indicates to the composite chip an event which is to result in an end of the allocation.

9. The composite chip of claim 1, wherein, based on the request, the switch indicates to the composite chip a quality of service which is to be supported with the resource.

10. A method at a composite chip, the method comprising:
providing, to a switch, capability information which comprises an identifier of a chiplet of the composite chip, and an identifier of a first functionality of the chiplet, wherein the switch provides an inventory based on the capability information;
providing, via a compute express link (CXL) link to the switch, a request to access a second functionality, wherein the switch accesses the inventory, based on the request, to identify a second chiplet of a second chip as comprising a resource which provides the second functionality; and
receiving from the switch an allocation of the resource to the composite chip based on the request, wherein the allocation configures a protocol stack of the composite chip to enable a routing of a communication to the second chiplet via the switch.

11. The method of claim 10, further comprising receiving from the switch an advertisement of an availability of multiple chiplets, wherein the advertisement is based on the inventory, and wherein the request is based on the advertisement.

12. The method of claim 10, wherein, based on the request, the switch disables an accessibility of the resource by one or more cores of the second chip.

13. The method of claim 10, wherein the resource is allocated to the composite chip at a chiplet level of granularity.

14. The method of claim 10, wherein the resource is allocated to the composite chip at a sub-chiplet level of granularity.

15. A system comprising:

a first composite chip to output first capability information comprising an identifier of a first chiplet, and an identifier of a first functionality of the first chiplet;

a second composite chip to output second capability information comprising an identifier of a second chiplet, and an identifier of a second functionality of the second chiplet;

a switch coupled to receive the first capability information and the second capability information, and a request from the first composite chip to access the second functionality, wherein the request is to be received via a compute express link (CXL) link, wherein the switch comprises:

first circuitry to generate an inventory of chiplets based on the first capability information and the second capability information;

second circuitry to access the inventory, based on the request, to identify the second chiplet as comprising a resource which provides the second functionality; and third circuitry to provide to the first composite chip an allocation of the resource based on the request, wherein the allocation is to configure a protocol stack of the first composite chip to enable a routing of a communication to the second chiplet.

16. The system of claim 15, the switch further comprising:

fourth circuitry which, based on the inventory, is to communicate to the first composite chip an advertisement of an availability of multiple chiplets, wherein the request is based on the advertisement.

17. The system of claim 15, wherein, based on the request, the switch is to disable an accessibility of the resource by one or more cores of the second composite chip.

18. The system of claim 15, wherein the resource is to be allocated to the first composite chip at a chiplet level of granularity.

19. The system of claim 15, wherein the resource is to be allocated to the first composite chip at a sub-chiplet level of granularity.

20. The system of claim 15, wherein, based on the request, the switch is to indicate to the first composite chip a quality of service which is to be supported with the resource.

\* \* \* \* \*